US011332319B2

(12) United States Patent
Bernhardt

(10) Patent No.: US 11,332,319 B2
(45) Date of Patent: May 17, 2022

(54) SYSTEM FOR CONVEYING DOUGH ALONG A CONVEYING SECTION

(71) Applicant: FRITSCH BAKERY TECHNOLOGIES GMBH & CO. KG, Markt Einersheim (DE)

(72) Inventor: Udo Bernhardt, Iphofen (DE)

(73) Assignee: FRITSCH BAKERY TECHNOLOGIES GMBH & CO. KG, Markt Einersheim (DE)

( * ) Notice: Subject to any disclaimer, the term of this patent is extended or adjusted under 35 U.S.C. 154(b) by 0 days.

(21) Appl. No.: 17/260,055

(22) PCT Filed: Jun. 11, 2019

(86) PCT No.: PCT/EP2019/065260
§ 371 (c)(1),
(2) Date: Jan. 13, 2021

(87) PCT Pub. No.: WO2020/011467
PCT Pub. Date: Jan. 16, 2020

(65) Prior Publication Data
US 2021/0276809 A1 Sep. 9, 2021

(30) Foreign Application Priority Data
Jul. 13, 2018 (DE) .......................... 102018117007

(51) Int. Cl.
*B65G 21/14* (2006.01)
*A21C 3/00* (2006.01)
(Continued)

(52) U.S. Cl.
CPC ............ *B65G 21/14* (2013.01); *A21C 3/00* (2013.01); *A21C 9/08* (2013.01); *B65G 15/08* (2013.01);
(Continued)

(58) Field of Classification Search
CPC .... B65G 21/14; B65G 15/08; B65G 21/2072; B65G 23/02; B65G 15/40; B65G 15/34;
(Continued)

(56) References Cited

U.S. PATENT DOCUMENTS 2,998,121 A * 8/1961 Gilbert .................. B65G 15/42
198/847
3,557,941 A * 1/1971 Thomson ............... B65G 15/34
198/818
(Continued)

FOREIGN PATENT DOCUMENTS

AU 566508 B2 10/1987
EP 1 728 435 B1 4/2012
(Continued)

OTHER PUBLICATIONS

Preliminary Amendment filed Jan. 13, 2021, Co-Pending U.S. Appl. No. 17/260,082, 10 Pages.
(Continued)

*Primary Examiner* — Mark A Deuble
(74) *Attorney, Agent, or Firm* — Brooks Kushman P.C.

(57) ABSTRACT

A system is provided for conveying dough along a conveying section, and the system comprises an elongate dough-conveying element that defines the conveying section. The dough-conveying element comprises a dough-supporting region that forms a supporting surface for dough conveyable or to be conveyed by means of the system, and at least one lateral region extending laterally along the dough-supporting region in the longitudinal direction of the dough-conveying element. The at least one lateral region is movably disposed or formed, in particular pivotally disposed or formed, relative to the dough-supporting region. Furthermore, the dough-conveying element exhibits flexurally-rigid material behavior in the vicinity of the dough-supporting
(Continued)

region and resiliently-extensible material behavior in the vicinity of the at least one lateral region.

20 Claims, 7 Drawing Sheets

(51) Int. Cl.

| | |
|---|---|
| *A21C 9/08* | (2006.01) |
| *B65G 15/08* | (2006.01) |
| *B65G 21/20* | (2006.01) |
| *B65G 23/02* | (2006.01) |
| *B65G 15/34* | (2006.01) |
| *B65G 15/40* | (2006.01) |
| *B65G 15/62* | (2006.01) |

(52) U.S. Cl.
CPC ............ *B65G 15/34* (2013.01); *B65G 15/40* (2013.01); *B65G 15/62* (2013.01); *B65G 21/2072* (2013.01); *B65G 23/02* (2013.01)

(58) Field of Classification Search
CPC ........ B65G 15/36; B65G 15/38; B65G 15/60; B65G 39/125; B65G 23/04; B65G 23/06; A21C 3/00; A21C 9/08; A21C 3/04; A21C 9/061

See application file for complete search history.

(56) References Cited

U.S. PATENT DOCUMENTS

| | | | | | |
|---|---|---|---|---|---|
| 3,615,152 | A | * | 10/1971 | Bouzat .................. | B65G 15/36 198/847 |
| 4,819,791 | A | * | 4/1989 | Melander ............... | B65G 15/40 198/818 |
| 5,060,787 | A | * | 10/1991 | Tingskog ............... | B65G 15/08 198/819 |
| 6,001,403 | A | | 12/1999 | Kobayashi | |
| 6,029,801 | A | * | 2/2000 | Odin ...................... | B65G 15/36 198/819 |
| 7,942,259 | B2 | * | 5/2011 | Steven .................. | B65G 15/36 198/819 |
| 8,464,862 | B2 | * | 6/2013 | Honeycutt ............. | B65G 15/42 198/822 |
| 8,844,710 | B2 | * | 9/2014 | Enshu .................... | B65G 15/40 198/819 |
| 8,931,630 | B2 | * | 1/2015 | Schmidt ................. | B65G 15/62 198/823 |
| 2003/0228396 | A1 | | 12/2003 | Okaizumi et al. | |

FOREIGN PATENT DOCUMENTS

| | | |
|---|---|---|
| EP | 3 066 928 A1 | 9/2016 |
| FR | 2 649 591 A1 | 1/1991 |

OTHER PUBLICATIONS

Substitute Specificaiton—Clean Copy, "System for Conveying Dough Along a Conveying Section", Co-Pending U.S. Appl. No. 17/260,082 37 Pages.

PCT International Search Report dated Sep. 3, 2019 (with English Translation), Application No. PCT/EP2019/065259, Applicant Fritsch Gmbh, 9 Pages.

PCT International Search Report dated Sep. 3, 2019, Application No. PCT/EP2019/065260, Applicant Fritsch Gmbh, 7 Pages.

German Office Action (with English Machine Translation), dated Jan. 27, 2022, Application No. 10 2018 117 007.6, Applicant Fritsch Bakery Technologies GmbH & Co. KG, 8 Pages.

German Office Action (with English Machine Translation), dated Jan. 27, 2022, Application No. 10 2018 117 004.1, Applicant Fritsch Bakery Technologies GmbH & Co. KG, 6 Pages.

* cited by examiner

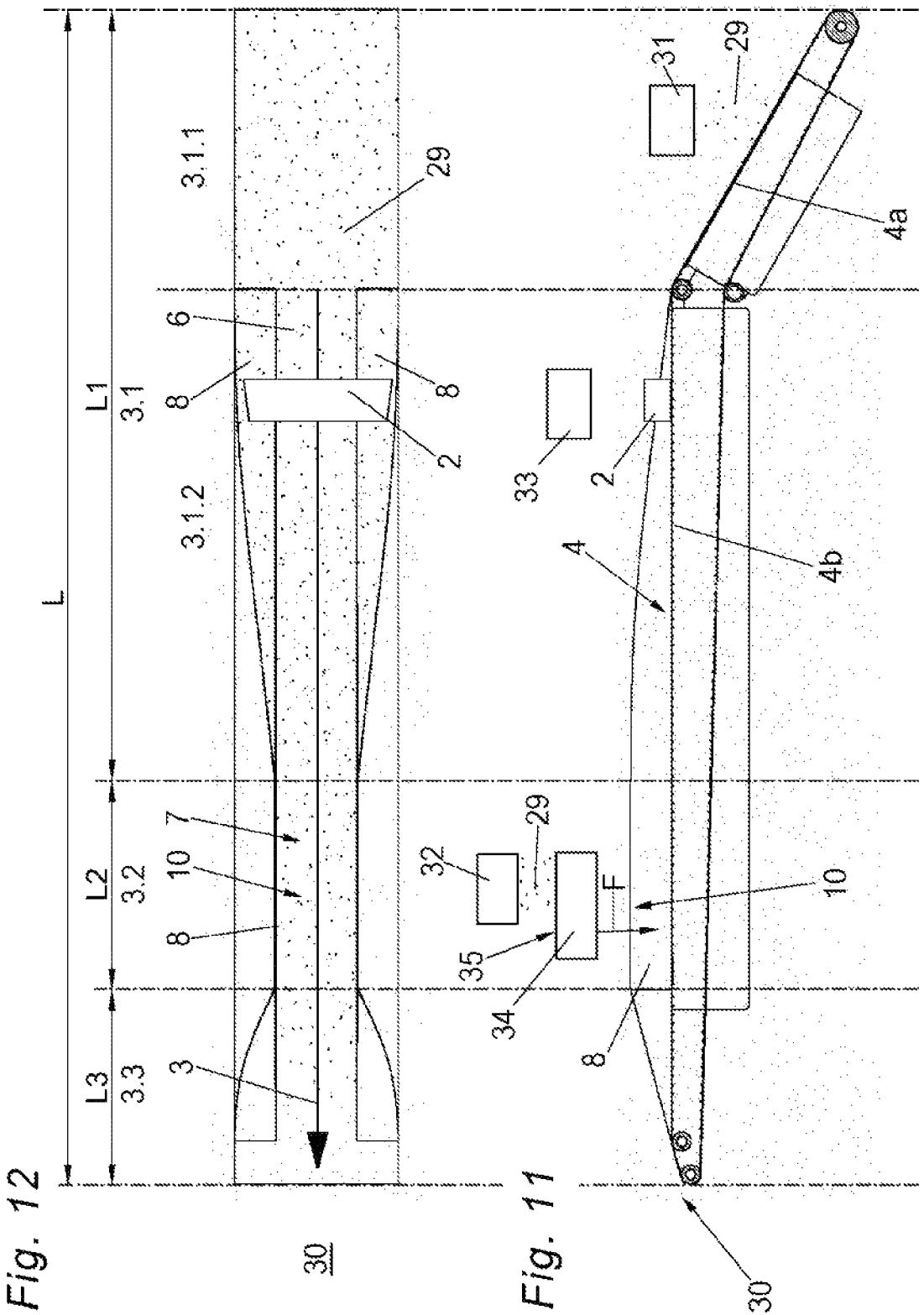

SYSTEM FOR CONVEYING DOUGH ALONG A CONVEYING SECTION

CROSS-REFERENCE TO RELATED APPLICATIONS

This application is the U.S. national phase of PCT Application No. PCT/EP2019/065260 filed on Jun. 11, 2019, which claims priority to German Patent Application No. DE 10 2018 117 007.6 filed on Jul. 13, 2018, the disclosures of which are incorporated in their entireties by reference herein.

TECHNICAL FIELD

The disclosure relates to a system for conveying dough along a conveying section, comprising an, in particular belt-like, elongate dough-conveying element defining a conveying section, which dough-conveying element comprises a dough-supporting region forming a supporting surface for dough which can be conveyed or is to be conveyed by means of the system, and at least one lateral region extending laterally along the dough-supporting region in the longitudinal direction of the dough-conveying element, wherein the at least one lateral region is arranged or configured so as to be movable, in particular pivotable, relative to the dough-supporting region.

BACKGROUND

Corresponding devices for conveying dough along a conveying section are generally known from the technological field of processing dough. A known embodiment of a corresponding system is described as a component of a bakery machine installation, e.g., in EP 3 066 928 A1.

As is known, corresponding systems are also used to form the dough that can be conveyed or is to be conveyed along a conveying section in a certain manner, i.e., in particular to give the dough a certain cross-sectional geometry, which is required for subsequent dough-processing processes, e.g., dough-forming processes, or which can at least be expedient.

In this context, a special configuration of the dough-conveying element in the dough-supporting region as well as in the respective lateral regions is desired with regard to the respective material behavior, which is not provided or not provided satisfactorily with dough-conveying elements of known systems.

By contrast, the underlying object of the disclosure is to provide an improved system for conveying dough along a conveying section.

SUMMARY

The system described herein is adapted for conveying dough along a conveying section, typically in a straight line. By means of the system, continuously or discontinuously produced dough portions or pieces can be conveyed along a conveying section. The system can also be referred to or considered as a dough-conveying system.

By means of the system, in particular (very) flowable or (very) soft doughs can be conveyed.

The system can form part of or be assigned to a superordinate system for processing dough.

The system comprises a dough-conveying element, in particular belt-like or -shaped or chain-like or -shaped, defining a conveying section. The dough-conveying element is typically elongated.

The dough-conveying element can be configured to extend parallel to a horizontal reference plane at least in sections, in particular completely; the dough-conveying element can thus have at least one dough-conveying element section configured to extend parallel to a horizontal reference plane. The same applies to the conveying section defined by the dough-conveying element. However, it is also conceivable that the dough-conveying element is configured to extend at an angular inclination with respect to a horizontal reference plane at least in sections, if necessary completely; the dough-conveying element can thus have at least one dough-conveying element section configured to extend at an angular inclination with respect to a horizontal reference plane. The same applies to the conveying section defined by the dough-conveying element.

The dough-conveying element can be configured in one or more pieces. A one-piece configuration of the dough-conveying element is typically formed by a belt-like or -shaped dough-conveying element body forming a conveyor belt. A multi-part configuration is typically formed by a chain-like or -shaped dough conveying element body forming a conveyor chain. A corresponding chain-like or -shaped dough conveying element body typically has a plurality of dough conveying element members connectable or connected to each other to form the dough conveying element body. In all embodiments, the dough-conveying element may also be referred to or deemed to be a dough conveyor belt.

The dough-conveying element can be arranged or configured to revolve around at least two, in particular roller-like or roller-shaped, deflection bodies. The system thus comprises at least two, in particular roller-like or roller-shaped, deflection bodies around which the dough-conveying element is arranged or formed to revolve. Corresponding deflection bodies can be arranged or formed, for example, on a supporting structure of the system, in particular a frame-like or frame-shaped supporting structure.

In all embodiments, the dough-conveying element comprises a dough-supporting region forming a supporting surface for dough that can be conveyed or is to be conveyed by means of the system, and at least one lateral region extending laterally along the dough-supporting region in the longitudinal direction of the dough-conveying element. Viewed in cross-section, the dough-supporting region typically forms a central region, i.e., the middle region, of the dough-conveying element. The dough-supporting region can occupy, for example, a proportion of 50% or more of the given total width of the dough-conveying element. For the typical embodiment of the dough-conveying element with two lateral regions, the dough-supporting region occupies about 50% and the two lateral regions each about 25% of the total width of the dough-conveying element.

The at least one lateral region is arranged or formed on the dough-supporting region extending laterally along the dough-supporting region in the longitudinal direction of the dough-conveying element. The at least one lateral region typically has a strip-like or strip-shaped geometry. The at least one lateral region can be connected in a form-fitting, force-fitting and/or material-fitting manner to a longitudinal side edge of the dough-supporting region on the dough-supporting region or in the vicinity of the dough-supporting region. Typically, the dough-conveying element comprises two corresponding lateral regions, wherein a first lateral region extending in the longitudinal direction of the dough-conveying element laterally along a first longitudinal side edge of the dough-supporting region is arranged or formed on the dough-supporting region, i.e., in particular is connected to a first longitudinal side edge of the dough-supporting region, and a second lateral region extending in the longitudinal direction of the dough-conveying element laterally along a second longitudinal side edge of the dough-supporting region is arranged or formed on the dough-supporting region, i.e., in particular is connected to a second longitudinal side edge of the dough-supporting region. The dough-conveying element can be configured symmetrically at least with respect to the arrangement of respective lateral regions and the dough-supporting region arranged centrally between them.

The at least one lateral region—the same applies to a configuration with two lateral regions—is arranged or formed on the dough-supporting region so as to be movable, i.e., in particular pivotable, relative to the dough-supporting region. The at least one lateral region can thus be moved into different positions and thus different orientations relative to the dough-supporting region.

By a movement of a lateral region relative to the dough-supporting region—this applies in particular to a corresponding movement of two lateral regions relative to the dough-supporting region—a dough-forming region can be formed which, viewed in cross-section, at least in sections laterally surrounds the dough which can be conveyed or is to be conveyed along the conveying section by means of the dough-conveying element, i.e., in particular in a U-like or U-shaped manner. The at least one lateral region can thus be arranged or formed so as to be movable, i.e., in particular pivotable, relative to the dough-supporting region at least in sections laterally, in particular U-like or U-shaped, viewed in cross-section, to form a dough-forming region surrounding the dough which can be conveyed or is to be conveyed along the conveying section by means of the dough-conveying element.

The at least one lateral region can be moved in particular in at least two positions relative to the dough-supporting region, wherein the at least one lateral region is arranged and/or aligned in a first position (substantially) parallel to the dough-supporting region, viewed in cross-section, in particular such that a (substantially) uniformly flat surface of the dough-conveying element is obtained, viewed in cross-section and, in a second position, viewed in cross-section at an angle, in particular at right angles, to the dough-supporting region, in particular such that a dough-forming region is formed laterally, in particular in a U-like or U-shaped manner, at least in sections, viewed in cross-section, surrounding the dough that can be conveyed or is to be conveyed along the conveying section by means of the dough-conveying element.

For the example of a pivotable arrangement or formation of a corresponding lateral region on the dough-supporting region, it thus applies that the at least one lateral region is arranged and/or aligned between a first pivot position, in which the at least one lateral region is arranged and/or aligned (substantially) parallel to the dough-supporting region, viewed in cross-section, in particular such that a (substantially) uniformly flat surface of the dough-conveying element results, viewed in cross-section and at least a second pivoted position, in which the at least one lateral region, viewed in cross-section, is arranged and/or aligned at an angle, in particular at right angles, to the dough-supporting region, in particular such that the dough-forming region surrounding the dough which can be conveyed or is to be conveyed along the conveying section by means of the dough-conveying element, viewed in cross-section, is formed at least in sections laterally, in particular U-shaped or U-shaped, and vice versa, can be pivoted.

In all configurations, the arrangement or formation of a corresponding lateral region on the dough-supporting region can be realized, for example, by a hinge-like or hinge-shaped connection of the lateral region to the dough-supporting region. A corresponding lateral region can be connected to the dough-supporting region, for example, by at least one hinge or joint element. In the case of a material connection of a corresponding lateral region to the dough-supporting region, which can be given, for example, in the case of a one-piece configuration of the at least one lateral region and of the dough-supporting region, a corresponding joint or hinge element can be provided Other types of connection of a lateral region to the dough-supporting region are conceivable with the provision of corresponding movability of the lateral region relative to the dough-supporting region.

The dough-conveying element comprises a flexurally-rigid material behavior in the vicinity of the dough-supporting region or in the dough-supporting region and a resiliently-extensible material behavior in the vicinity of the at least one lateral region or in the at least one lateral region. The dough-conveying element thus comprises locally different mechanical properties and thus locally different material behavior, in that it is configured to be specifically flexurally-rigid or hard in the vicinity of the dough-supporting region or in the dough-supporting region and to be specifically resiliently-extensible or soft in the vicinity of the at least one lateral region or in the at least one lateral region. In such a way, an improved dough-conveying element, in particular with regard to dough-conveying and dough-forming, and thus an improved system is provided, as the dough-conveying element in the vicinity of the dough-supporting region or in the dough-supporting region has a desired flexurally or transversely rigid and thus generally rigid or hard material behavior and in the vicinity of the at least one lateral region or in the at least one lateral region a desired resiliently-extensible and thus generally soft material behavior. This targeted combination of different mechanical properties or different material behavior in the vicinity of the dough-supporting region or in the dough-supporting region and in the vicinity of the at least one lateral region or in the at least one lateral region has a positive effect on dough-conveying and dough-forming.

The flexurally-rigid material behavior in the vicinity of the dough-supporting region or in the dough-supporting region is primarily appropriate because considerable forces can act on the dough-supporting region when the lateral regions are moved or pivoted relative to the dough-supporting region, which can lead to deflection of the dough-supporting region without corresponding flexural rigidity. Furthermore, the flexurally-rigid material behavior in the vicinity of the dough-supporting region or in the dough-supporting region can be expedient, as considerable forces, i.e., in particular bending or pressure forces, can act on the dough-supporting region during dough-conveying and dough-forming, which can be absorbed by the flexurally-rigid material behavior of the dough-conveying element in the vicinity of the dough-supporting region. The dough can thus be deposited, conveyed and shaped on a mechanically stable dough-conveying element in the vicinity of the dough-supporting region, which enables reproducible geometrically defined dough-forming. Due to the locally flexurally-rigid configuration (even with comparatively large dough masses), there is no or a much reduced possibility of deflection of the dough-conveying element in the vicinity of the dough-supporting region. The flexural rigidity is not selected to be so high that deflection of the dough-conveying element at corresponding deflection bodies is no longer possible.

The resiliently-extensible material behavior in the vicinity of the at least one lateral region or in the at least one lateral region is therefore expedient, as considerable forces, i.e., in particular expansion or tensile forces, can act on the at least one lateral region during a corresponding movement, i.e., in particular a corresponding pivoting movement, relative to the dough-supporting region, which forces can be absorbed by the resiliently-extensible material behavior of the dough-conveying element in the vicinity of the at least one lateral region. An expansion of the at least one lateral region caused by a movement of the at least one lateral region relative to the dough-supporting region is thus possible without risk of damage to the dough-conveying element due to the resiliently-extensible material behavior. The resiliently-extensible material behavior can also enable resilient recovery behavior of the at least one lateral region from an expanded state, which typically occurs with corresponding movement of the at least one lateral region toward the dough-supporting region, to a less or non-expanded state.

The different material behavior in the vicinity of the dough-supporting region or in the dough-supporting region and in the vicinity of the at least one lateral region or in the at least one lateral region can be caused, for example, by different materials or material structures for forming the dough-supporting region and the at least one lateral region, i.e., different material pairings or material structure pairings. Thus, a flexurally-rigid or hard material or a flexurally-rigid or hard material structure can be used in the vicinity of the dough-supporting region or in the dough-supporting region, and an resiliently-extensible or soft material or an resiliently-extensible or soft material structure can be used in the vicinity of the at least one lateral region or in the at least one lateral region.

Alternatively or additionally, it is also conceivable, for example, to generate locally different mechanical properties and thus locally different material behavior by structural measures. In the vicinity of the dough-supporting region or in the dough-supporting region, for example, an increased thickness or wall thickness of the respective material or the respective material structure can be provided and/or the respective material or the respective material structure can be provided with reinforcing elements, such as ribs. In the vicinity of the at least one lateral region or in the at least one lateral region, for example, a reduced thickness or wall thickness of the respective material or the respective material structure can be provided and/or the respective material or the respective material structure can be provided with weakening elements, such as recesses. This also applies in particular to the use of (chemically) similar or identical materials for forming the dough-conveying element in the dough-supporting region and the at least one lateral region.

In summary, an improved system for conveying dough along a conveying section is provided.

The dough-conveying element can be configured, in particular in the vicinity of the dough-supporting region or in the dough-supporting region, at least in sections, in particular completely, by a flexurally-rigid stiffening structure for flexural or transverse stiffening of the dough-supporting region or include at least one such structure. The stiffening structure can be formed, for example, by a flexurally-rigid material or a flexurally-rigid material structure. Suitable flexurally-rigid materials include, for example, flexurally-rigid plastic materials. In particular, flexurally-rigid thermoset or thermoplastic materials, possibly provided with reinforcing fibers such as glass fibers, are conceivable. Arrangements and/or alignments of materials or components formed from such materials which result in a bending rigidity can be considered as flexurally-rigid material structures. Conceivable are, for example, grid-like or rib-like arrangements or alignments of corresponding components. As mentioned, the bending rigidity is selected such that deflection of the dough-conveying element on corresponding deflection bodies is possible.

A corresponding stiffening structure can be formed, for example, by at least one flexurally-rigid supporting body, wherein a resiliently-extensible material forming the at least one lateral region or a resiliently-extensible material structure forming the at least one lateral region is attached to and/or on the at least one supporting body. The resiliently-extensible material or the resiliently-extensible material structure may, for example, be attached to the at least one supporting body as a lateral region element adjacent to the at least one supporting body. Alternatively or additionally, the resiliently-extensible material or the resiliently-extensible material structure may be attached to and/or on the at least one carrier body as a supporting element resting on the at least one carrier body. The resiliently-extensible material or the resiliently-extensible material structure can therefore span a surface or upper side of the at least one supporting body at least in sections, in particular completely. In this context, it is also possible for a section of the resiliently-extensible material or of the resiliently-extensible material structure to form the dough-supporting region at least in sections, if necessary, completely. The bending rigidity of the dough-conveying element in the vicinity of the dough-supporting region or in the dough-supporting region is also given in this case due to the bending rigidity of the at least one supporting body. Of course, several supporting bodies can be provided, e.g., in a row or stack-like arrangement.

A supporting body can have a rectangular geometry when viewed in cross-section, for example. The maximum width of the supporting body is typically dimensioned so that it corresponds to the width of the dough-supporting region. The same applies if the supporting body is made up of several parts, i.e., if there are several supporting body segments forming the supporting body.

The resiliently-extensible material or the resiliently-extensible material structure can in all cases be attached to and/or on the at least one supporting body, e.g., by means of a form-fit, force-fit and/or material-fit. In particular, material-locking attachment methods such as adhesive bonding or welding are considered, as these allow a stable connection, in particular also of chemically possibly poorly or non-compatible materials.

The dough-conveying element can be provided, at least in the dough-supporting region, at least in sections with a stiffening structure comprising at least one stiffening element for bending or transverse stiffening of at least the dough-supporting region. The stiffening structure gives the dough-conveying element, i.e., in particular the dough-supporting region, as mentioned, a sufficiently high flexural or transverse rigidity so that the forces acting on the dough-supporting region during movement or pivoting of the lateral region(s) relative to the dough-supporting region do not lead to deflection of the dough-supporting region and a reproducible defined dough forming is possible with the dough-conveying element, which may be necessary or at least expedient for subsequent dough-processing operations. The dough that can be conveyed or is to be conveyed by means of the system can thus be given a defined cross-sectional geometry in a reproducible manner. In particular, the dough that can be conveyed or is to be conveyed by means of the device can be given a defined rectangular cross-sectional geometry during conveying along the conveying section, since the dough-supporting region does not tend to sag due to stiffening structure, in particular also when the lateral region(s) is/are pivoted. Due to the stiffening of the dough-conveying element in the vicinity of the dough-supporting region, a (largely) flat support of the dough on the dough-conveying element is ensured.

Due to the stiffening of the dough-supporting element in the vicinity of the dough-supporting region, any (mechanical) tension acting on the dough-supporting element in order to keep the dough-supporting element level can also be reduced, since the dough-supporting element is already mechanically stable, i.e., in particular stiff, to such an extent that an (additionally) applied tension is not required or is required to a (considerably) reduced extent in order to keep the dough-supporting region or the dough-supporting element flat.

The (additional) mechanical stabilization or stiffening of the dough-conveying element at least in the dough-supporting region brought about by the stiffening structure can also have a positive effect on the conveying properties of the dough-conveying element.

In an exemplary embodiment, the stiffening structure can comprise at least one stiffening element in the form of a stiffening body, in particular rod-like or strut-like, arranged or formed on or in the dough-supporting region. The stiffening structure may comprise at least a two- or three-dimensional arrangement of a plurality of corresponding stiffening bodies. A corresponding arrangement of a plurality of corresponding stiffening bodies may be selected such that a stiffening effect results due to the arrangement and/or alignment of the stiffening bodies. This can apply, for example, to a grid-like and/or mesh-like arrangement of stiffening bodies. Corresponding stiffening bodies can thus be arranged or formed in one or more planes extending in one or more spatial directions. The number and arrangement of corresponding stiffening bodies can vary locally, so that targeted locally a different rigidity can be generated.

The rigidity of a corresponding stiffening body may exceed the rigidity of the remaining dough-conveying element or of a base material forming the remaining dough-conveying element. A corresponding stiffening body can thus be formed from a more rigid material compared to the dough-conveying element, i.e., for example, a comparatively more rigid plastic or metal. However, this is not absolutely necessary, as a stiffening effect, as mentioned, can also result from the arrangement of several corresponding stiffening bodies.

A corresponding stiffening body can be configured, for example, as a tension body bringing about stiffening of at least the dough-supporting region, in particular a tension rod bringing about stiffening of at least the dough-supporting region.

In another exemplary embodiment, the stiffening structure can include at least one stiffening element in the form of a reinforcing fiber arrangement, in particular textile-like, arranged or formed in the dough-supporting region, on or in the dough-conveying element. The reinforcing fiber arrangement typically comprises an ordered or disordered textile-like two- or three-dimensional arrangement of a plurality of reinforcing fibers. A textile-like arrangement of reinforcing fibers may be, for example, knitted, woven, tangled, or crocheted; thus, the reinforcing fiber arrangement may be, for example, a knitted, woven, tangled, or crocheted fabric. A textile-like arrangement of reinforcing fibers is typically selected to provide a stiffening effect due to the arrangement and/or alignment of the reinforcing fibers. This may apply, for example, to a knitted, woven, tangled or crocheted arrangement of reinforcing fibers. A corresponding reinforcing fiber arrangement or corresponding reinforcing fibers can thus be arranged or formed in one or more planes extending in one or more spatial directions. The number and arrangement of corresponding reinforcing fibers can vary locally so that a locally different rigidity can be generated in a targeted manner.

The rigidity of a corresponding reinforcing fiber arrangement or reinforcing fiber can exceed the rigidity of the remaining dough-conveying element or a base material forming the remaining dough-conveying element. Accordingly, a corresponding reinforcing fiber arrangement or reinforcing fiber may be formed of a stiffer material compared to the dough-conveying element, i.e., for example, a comparatively stiffer metal or plastic. However, this is not absolutely necessary, as a stiffening effect, as mentioned, can also result from the arrangement of several corresponding reinforcing fiber arrangements or reinforcing fibers.

The reinforcing fiber arrangement can be formed, for example, by a, particularly textile-like, arrangement of carbon and/or glass fibers and/or metal fibers or wires.

In a further exemplary embodiment, the stiffening structure can comprise at least one stiffening element in the form of a reinforcing base arranged or attached, in particular flat, in the vicinity of a surface of the dough-conveying element facing away from the dough-supporting region. Of course, an arrangement of several reinforcing bases can be provided. A corresponding arrangement of several reinforcing bases can be selected in such a way that an (additional) stiffening effect results due to the arrangement and/or alignment of the reinforcing bases. This can apply, for example, to a stack-like or -shaped arrangement of reinforcing bases. Corresponding reinforcing bases can thus be arranged or formed in one or more planes extending in one or more spatial directions. The number and arrangement of corresponding reinforcing bases can vary locally, so that a locally different rigidity can be generated in a targeted manner.

The rigidity of a corresponding reinforcing base can exceed the rigidity of the remaining dough-conveying element or of a base material forming the remaining dough-conveying element. A corresponding reinforcing base can thus be formed of a stiffer material compared to the dough-conveying element. However, this is not absolutely necessary, as a stiffening effect, as mentioned, can also result from the arrangement of several corresponding reinforcing bases. It is also conceivable that a corresponding reinforcing base has increased rigidity due to a greater thickness compared to the dough-conveying element.

A corresponding reinforcing base may be formed of a rigid material, i.e., for example, a rigid plastic or metal, or a rigid material structure, i.e., for example, a rigid plastic or metal structure, such as a chain-like or -shaped plastic or metal structure.

All the embodiments of the stiffening structure described can be combined with or among each other as desired.

The dough-conveying element can be flexible at least in sections at least in the region of its surface having the dough-supporting region, i.e., in particular the surface of the dough-conveying element having the dough-supporting region can be configured with greater flexibility or softness compared to the surface not having the dough-supporting region. The dough-conveying element can thus be configured, at least in the dough-supporting region, with different flexible properties or degrees of hardness or softness. At this point, it should be mentioned in general that the dough-conveying element can be formed, for example, from a natural or synthetic elastomer material or a natural or synthetic resin material, in particular a PU resin material.

Furthermore, it should generally be mentioned that the lateral regions have a lower hardness compared to the dough-supporting region. For example, the lateral regions may have a hardness in a range between 70 and 80 Shore A, whereas the dough-supporting region may have a hardness of at least 95 Shore A, for example.

Although the dough-supporting region, as described, can be configured in one or more layers, the lateral regions of the dough-conveying element in all embodiments are typically configured (only) in one layer. This is to be understood in particular as meaning that the dough-conveying element, in contrast to the conveyor belt device described in EP 3 066 928 A1, does not comprise a dough conveyor belt which is of at least two-layer configuration in the region of its longitudinal side edges, with lateral upper layers being arranged flexibly and at a distance from the longitudinal side edges via a respective, in particular line-like, connection to the or a lower layer or a central region.

In the region of its surface facing away from the dough-supporting region, the dough-conveying element can be configured, at least in sections, with a drive structure, in particular a toothed belt-like or belt-shaped drive structure, or can comprise such a drive structure. The drive structure is typically set up to cooperate with a drive device that sets the dough-conveying element into a conveying motion. In the vicinity of its surface facing away from the dough-supporting region, which can also be referred to or considered as the inside of the dough-conveying element, the dough-conveying element can thus be configured with the functionality of a power transmission element, such as a drive or transmission belt. The interaction between the drive structure and a corresponding drive device can consist in particular in a mechanical coupling, i.e., in particular in a mechanical engagement, of the drive structure on the dough-conveying element side, e.g., of respective drive elements of the drive structure on the dough-conveying element side, with drive elements of the drive device corresponding thereto. The interaction of the drive structure on the dough-conveying element side and the drive device—which is typically a drive motor or typically includes at least one such motor—enables a drive force to be transmitted to the dough-conveying element to set it in a conveying motion. It is conceivable that a drive structure on the dough-conveying element side can also exert a stiffening effect on the dough-conveying element due to its geometrically constructive configuration and can therefore be considered a stiffening structure. The drive structure or respective drive elements of the drive structure on the dough-conveying element side can extend, viewed in cross-section, at least in sections, in particular completely, over the width of at least the dough-supporting region.

The system can include a tensioning device that (mechanically) tensions the dough-conveying element, in particular in the longitudinal direction of the dough-conveying element. A corresponding tensioning device is set up to generate a tensioning force that tensions the dough-conveying element, in particular in the longitudinal direction of the dough-conveying element. A corresponding tensioning device may comprise one or more tensioning elements acting on the dough-conveying element for tensioning the dough-conveying element, in particular in the longitudinal direction of the dough-conveying element. Corresponding tensioning elements can be, for example, tensioning springs.

It was mentioned that the at least one lateral region for forming a dough-supporting region surrounding the dough that can be conveyed or is to be conveyed by means of the dough-conveying element along the conveying section, viewed in cross-section, can be arranged movably, i.e., in particular pivotally, relative to the dough-supporting region at least in sections laterally, in particular U-like or U-shaped, or formed on the dough-supporting region.

The system can include a supporting device which is arranged to support and/or stabilize the at least one lateral region in the second position or the second pivoted position explained above. A corresponding supporting device typically includes at least one supporting body comprising at least one supporting body portion supporting the at least one lateral region in the second position or the second pivoted position. A corresponding supporting body is typically arranged or formed extending in the longitudinal direction of the dough-conveying element. A corresponding supporting body can be configured, for example, as a supporting strut. The supporting device may comprise a plurality of corresponding supporting struts, in particular in parallel arrangement and alignment. A corresponding supporting body may also be configured, for example, as a supporting wedge; a corresponding supporting body may thus be wedge-like or wedge-shaped, at least in sections, when viewed in cross-section. Typically, a corresponding supporting device, i.e., at least one corresponding supporting body, is associated with each lateral region.

For all embodiments, a corresponding supporting body may be formed, for example by segmentation, with differently functionalized or supporting body sections. In this regard, a first supporting body portion may support a first lateral region portion in a first angular orientation relative to the dough-supporting region, and at least a second supporting body portion may support a second lateral region portion in a second angular alignment relative to the dough-supporting region. The first angular alignment of the first lateral region portion, when viewed in cross-section, may condition an angular alignment of the first lateral region portion in an angular range between 0 and 90° relative to the dough-supporting region. The second angular alignment of the second lateral region portion, when viewed in cross-section, may cause the second lateral region portion to be angularly aligned in an angular range between 0 and 90° relative to the first lateral region portion.

The supporting body device can thus include two supporting bodies or supporting body portions that can be arranged and aligned differently relative to a dough placed on the dough-supporting region or differently arranged and aligned relative to a dough placed on the dough-supporting region. The alignment of the supporting bodies or supporting body portions can be effected by a separate guiding device, which moves the supporting bodies or supporting body portions into the corresponding arrangement or alignment relative to the first or second lateral region portion.

Accordingly, a lateral region can also comprise two lateral region portions that can be arranged and aligned differently relative to a dough placed on the dough-supporting region or differently arranged and aligned relative to a dough placed on the dough-supporting region. In this case, a first lateral region portion can be arranged and aligned in particular relative to a dough placed on the dough-supporting region such that it laterally surrounds or supports the dough, and a second lateral region portion can be arranged and aligned in particular relative to the dough placed on the dough-supporting region such that it surrounds or supports the dough at least in sections on the upper side. Support of the dough on the underside is provided by the dough-supporting region, as explained.

The two lateral region portions can thereby be independently arranged and aligned in different arrangements or alignments relative to the dough-supporting region or a dough placed on the dough-supporting region.

The above explanations can be explained by way of example using a dough or dough piece that is (substantially) rectangular in cross-section and rests on the dough-supporting region with one elongate side (underside). The first lateral region portion supports the dough laterally, i.e., in the region of the short sides of the rectangular dough or dough piece, the second lateral region portion supports the dough or dough piece on the upper side, i.e., in the region of its exposed elongate side (upper side) of the dough or dough piece.

Independent of a corresponding guiding device for the supporting body or bodies, the system can include a guiding device which is set up for guiding, in particular for transversely guiding, the dough-conveying element along the conveying section. A corresponding guiding device can comprise a recessed receiving region, in particular in the shape of a trough, for receiving the dough-supporting region, in particular with a precise fit. A corresponding guiding device can further comprise at least one supporting region for supporting the at least one lateral region, which supporting region is arranged elevated, in particular, in comparison to the receiving region, i.e., in particular, to a base of the receiving region. A corresponding guiding device may have a U-like or U-shaped cross-sectional geometry.

This results in the fact that the dough-conveying element (also independently of the presence of a corresponding guiding device) can have a stepped geometry when viewed in cross-section. A stepped geometry of the dough-conveying element, viewed in cross-section, can result from a reduced thickness or wall thickness of the at least one lateral region compared to the dough-supporting region, as well as its arrangement or formation on the dough-supporting region; the at least one lateral region is typically arranged or formed in the region of an upper portion of a short side of the dough-supporting region in the case of a dough-supporting region that is (substantially) rectangular, viewed in cross-section. The same applies to other geometries of the dough-supporting region.

In addition to the described system for conveying dough along a conveying section, the disclosure also relates to a dough-conveying element for a corresponding system. All explanations in connection with the system, i.e., in particular all explanations concerning the dough-conveying element, apply analogously to the dough-conveying element.

Moreover, in addition to the described system for conveying dough along a conveying section, the disclosure also relates to a system for processing dough. The system comprises at least one system as described for conveying dough along a conveying section. The system may be arranged upstream of a dough-receiving and/or dough-processing device arranged downstream thereof in the dough-conveying direction, i.e., typically downstream of the conveying section, in particular of a further dough-forming device. All explanations in connection with the system apply analogously to the facility.

In all configurations, the dough-conveying element defines a conveying section of defined total length. In a one-piece configuration of the dough-conveying element, the conveying section or its total length is defined by the (single) dough-conveying element body. In a multi-part configuration of the dough-conveying element, the conveying section or its total length is defined by the several separate dough-conveying element bodies arranged or configured in series.

The conveying section can have several differently functionalized conveying section portions, which are explained individually below:

The conveying section has a first conveying section portion. In the first conveying section portion, dough to be conveyed can be placed on the dough-conveying element, in particular in a dough-supporting region of the dough-conveying element. In the first conveying section portion, a separating agent can further be applied to the dough-conveying element. The application of the separating agent typically takes place, as will be seen in the following, in a region of the first conveying section portion which is arranged upstream of a region of the first conveying section portion in which the dough can be placed or deposited on the dough-conveying element. The first conveying section portion may be referred to or deemed to be an infeed or dough depositing section. As will be seen in the following, the length of the first conveying section portion is longitudinally dimensioned such that it permits extensive application of separating agent, i.e., in particular complete application of separating agent over the entire width of the dough-conveying element, prior to the actual depositing of the dough.

Thus, the system typically comprises a separating agent application device (first separating agent application device) associated with the first conveying section portion, which is adapted to apply a separating agent, e.g., flour, to the first conveying section portion or a conveying section sub-portion of the first conveying section portion. The separating agent application device is thus arranged relative to the conveying section or the first conveying section portion such that it enables a separating agent to be applied to a sub-portion of the first conveying section portion, which is arranged upstream of a sub-portion of the second conveying section portion having the dough-supporting region, i.e., a corresponding conveying section sub-portion of the first conveying section portion.

The (first) separating agent application device can in particular be adapted to apply the separating agent, viewed in cross-section, over the entire width of the first conveying section portion or the entire width of the dough-conveying element in the vicinity of the first conveying section portion. In this way, as mentioned, there is the possibility of an extensive or complete application of separating agent to the dough-conveying element, which has a positive effect on the subsequent dough-conveying and dough-forming of the dough.

It is expedient if the dough can be placed or deposited on the first conveying section portion in a region of the first conveying section portion in which a dough-forming region surrounding the dough, in particular U-like or U-shaped, is at least partially formed. The dough is thus expediently deposited in a region of the first conveying section portion in which the dough-conveying element already has a changed cross-sectional geometry compared to its original flat cross-sectional geometry. This partial change in the cross-sectional geometry of the dough-conveying element in the first conveying section portion, which already takes place in the first conveying section portion, is typically associated with the aforementioned formation of a corresponding dough-forming region. The dough-conveying element is thus already altered in its cross-sectional geometry in the first conveying section portion. In particular, the dough-conveying element is transferred by moving lateral regions of the dough-conveying element arranged or formed movably relative to a dough-supporting region of the dough-conveying element relative to the dough-supporting region into at least one intermediate position lying between a first and a second position, in which the dough-conveying element has a bowl-like or bowl-shaped geometry when viewed in cross section. The dough is thus expediently placed on the dough-conveying element in a region of the first conveying section portion in which a dough-forming region surrounding the dough, in particular U-like or U-shaped, is already at least partially formed, thus providing a certain "cupping" of the dough-conveying element. This has advantages for the application of separating agent to lateral regions of the dough—this applies in particular to particularly flowable or soft doughs. The depositing of the dough in a region of the first conveying section portion in which a dough-forming region surrounding the dough, in particular U-like or U-shaped, is at least partially formed, also has a positive effect on the dough-conveying and further dough-forming; this results in particular from the fact that the dough—this also applies in particular to particularly flowable or soft dough—has no possibility of flowing laterally.

In a second conveying section portion arranged downstream of the first conveying section portion, the dough to be conveyed or conveyed along the conveying section is variable in its cross-sectional geometry. The second conveying section portion can be referred to or deemed to be a dough-forming section. Due to the application of separating agent and depositing of dough on the dough-conveying element, which already takes place or has taken place in the first conveying section portion, the dough conveyed in the second conveying section portion is already deposited on a dough-conveying element extensively, i.e., in particular completely, provided with separating agent. As will be shown in the following, the dough can be formed in the second conveying section portion in particular by a further angular, i.e., in particular right-angled, alignment of lateral regions of the dough-conveying element movably arranged or formed relative to a dough-supporting region of the dough-conveying element relative to the dough-supporting region of the dough-conveying element. As will likewise be shown in the following, the dough-forming expediently results in a (substantially) rectangular cross-sectional geometry of the dough. It has already been mentioned that a corresponding movement of the lateral region or regions expediently already takes place at least partially in the first conveying section portion.

In a third conveying section portion arranged downstream of the second conveying section portion, the dough to be conveyed or conveyed, which has been altered in its cross-sectional geometry, can be conveyed in the direction of a transfer region in which the dough to be conveyed or conveyed can be transferred to a dough-processing system which can be arranged or arranged downstream of the device. The third conveying section portion can be referred to or deemed to be the discharge or transfer section. A corresponding dough-processing system that can be arranged or is arranged downstream of the system typically does not form a component of the system. If the system is regarded as a functional component of a superordinate system for processing dough, a corresponding dough-processing system can, e.g., represent a further component of the system arranged functionally downstream of the system.

Each of the conveying section portions mentioned may in turn include at least two conveying section sub-portions, which may have different sub-functions of the superordinate function of the respective conveying section portion. This can be explained by way of example with reference to the first conveying section portion, which can be sub-divided into conveying section sub-portions, wherein a separating agent can be applied to the dough-conveying element in a first conveying section sub-portion.

In this context, it should be mentioned that the first conveying section portion can have at least two differently oriented conveying section sub-portions, wherein a first conveying section sub-portion is arranged angularly inclined relative to at least one second conveying section sub-portion arranged downstream of the first conveying section sub-portion. The angularly inclined orientation of the at least one first conveying section sub-portion relative to the second conveying section sub-portion can be realized by an angularly inclined orientation of at least one dough-conveying element section relative to at least one further dough-conveying element section, and enables a compact(er) construction of the system. The same can apply in principle to other conveying section portions. The dough can be placed in the first conveying section portion—irrespective of its orientation—in the second conveying section sub-portion, and the separating agent can be applied—irrespective of its orientation—in the first conveying section sub-portion.

The system typically includes a dough depositing device associated with the first conveying section portion, in particular a dough-portioning device, which is adapted to continuously or discontinuously deposit dough, in particular defined dough portions, onto the first conveying section portion. The dough depositing device or the dough-portioning device is typically arranged relative to the conveying section or the first conveying section portion such that it enables depositing of dough onto a sub-region of the first conveying section portion, i.e., for example, the aforementioned second conveying section sub-portion, which is arranged downstream of a sub-portion comprising a separating agent application region, i.e., for example, the first conveying section sub-portion, of the first conveying section portion.

The dough depositing device or the dough-portioning device can, for example, be configured as a star roller portioning device or include such a device.

The dough depositing device or the dough-portioning device can include a dough-discharging region which is arranged or formed extending along the first conveying section portion. The dough-depositing device or the dough-portioning device can thus include a dough-discharging region formed, for example, by a dough-discharging opening extending in the longitudinal direction of the dough-conveying element, which can have a positive effect on dough-conveying and dough-forming.

The system typically includes a dough-forming device associated with the second conveying section portion and comprising at least one dough-forming element. The dough-forming device is adapted to exert a force, in particular a vertically oriented force, on the dough in order to deform the dough in a defined manner. In such a way, the aforementioned alteration of the cross-sectional geometry or forming of the dough can be effected or promoted. Due to the described extensive application of separating agent via the first and/or second separating agent application device, the possibility of the dough also adhering to the dough-forming element is prevented or at least considerably reduced.

The dough-forming device can, for example, be configured as a dough-forming roller device or as a dough-forming cylinder device or comprise such a device. A dough-forming element can therefore be, for example, a dough-forming roller or a dough-forming cylinder.

In order to enable extensive application of separating agent—this may be, for example, a solid, such as flour, and/or a liquid, such as oil—to the dough-conveying element, in particular before the dough is placed on the dough-conveying element, the first conveying section portion may, as already indicated, be particularly dimensioned in terms of length.

The first conveying section portion can, for example, have a length of at least 33%, in particular more than 33%, preferably at least 40%, more preferably more than 45%, more preferably at least 50%, more preferably more than 55%, more preferably more than 60%, of the total length of the conveying section. Thus, for example, the first conveying section portion can have a length in a range between 33% and 70%, in particular between 40% and 70%, preferably between 45% and 70%, more preferably between 50% and 70%, more preferably between 55% and 70%, more preferably between 60% and 70%, more preferably between 65% and 70%, of the total length of the conveying section.

This significantly longer configuration of the first conveying section portion compared to known conveying sections, such as that known from EP 3 066 928 A1 mentioned introductorily, ensures the possibility of extensive application of separating agent to the dough-conveying element before the dough is actually placed on the dough-conveying element, which has a positive effect on (further) dough-conveying and dough-forming. The first conveying section portion or a conveying section sub-portion of the first conveying section portion can be completely provided with separating agent, in particular also over its width. In particular, extensive application of separating agent over the entire width of the dough-conveying element is possible before the dough is actually deposited on the dough-conveying element so that the dough that can be deposited on the dough-conveying element in the first conveying section portion, i.e., in particular in a dough-forming region of the dough-conveying element, can already be deposited on a dough-conveying element that is extensively or completely provided with separating agent. The separating agent can thus be applied such that the separating agent (as far as possible) completely surrounds the dough resting on the dough-conveying element, at least in the vicinity of possible contact regions with the dough-conveying element.

The particular lengthwise dimension of the first conveying section portion may result in the first conveying section portion having a greater length than the second and/or the third conveying section portion.

The second and third conveying section portion can have a combined length of less than 50% of the total length of the conveying section. The total length of the second and third conveying section portion resulting from the sum of the length of the second and third conveying section portion can therefore be less than 50% of the total length of the conveying section. Also, in such a way it is ensured that the first conveying section portion has a length which allows an extensive application of separating agent as described.

The second and third conveying section portion can be dimensioned equally or differently in terms of length; the second and third conveying section portion can thus have the same length or different lengths. Flexible adaptation of the lengths of the second and third conveying section portions, with the provision that the first conveying section portion has a length of at least 33% of the total length of the conveying section, provides a flexible adaptation option for the respective conveying section portions with regard to specific structural requirements for the system.

The system can include a separating agent application device (second separating agent application device) associated with the second conveying section portion, which is adapted to apply a separating agent, in particular flour, to the second conveying section portion, in particular to exposed regions of dough conveyed along the second conveying section portion, and/or to a dough-forming device associated with the second conveying section portion and comprising at least one dough-forming element, in particular in the form of a dough-forming roller or a dough-forming cylinder. This separating agent application device ensures that a sufficient quantity of separating agent is always present in the second conveying section portion, in which, as mentioned, a corresponding alteration of the cross-sectional geometry of the dough or forming of the dough takes place.

The (second) separating agent application device can be adapted to apply the separating agent, viewed in cross-section, over the entire width of the second conveying section portion, in particular the entire width of the exposed region of the dough conveyed along the second conveying section portion, and/or the entire width of the dough-forming element. In such a way, the possibility of an extensive and/or complete application of separating agent to the dough-conveying element and/or the dough-forming element during the alteration of the cross-sectional geometry of the dough and/or during the forming of the dough is ensured, which has a positive effect on the forming and further conveying of the dough.

The application of the separating agent by means of the first and/or the second separating agent application device can be done, depending on the type of separating agent, i.e., in particular on the type of its aggregate state, e.g., by blowing, trickling, casting, pouring, etc. The first and/or second separating agent application device can be configured accordingly, e.g., as a blowing, trickling, casting or pouring device, or can comprise such a device.

In addition to the described system for conveying dough along a conveying section, the disclosure also relates to a facility for processing dough. The facility includes at least one system for conveying dough along a conveying section, as described. The system can be arranged upstream of a dough receiving and/or dough-processing system arranged downstream thereof in the dough-conveying direction, i.e., typically downstream of the conveying section, in particular of a further dough-forming system. All explanations in connection with the system apply analogously to the facility.

Moreover, the disclosure relates to a method for conveying dough along a conveying section. According to the method, a conveying section as described is used, which includes a first conveying section portion, in which dough to be conveyed along the conveying section is placed on the dough-conveying element, a second conveying section portion arranged downstream of the first conveying section portion, in which dough to be conveyed or conveyed along the conveying section is placed on the dough-conveying element and is altered in its cross-sectional geometry, and a third conveying section portion arranged downstream of the second conveying section portion, in which conveyed dough, which is altered in its cross-sectional geometry, is placed on the dough-conveying element, and a third conveying section portion arranged downstream of the second conveying section portion, in which conveyed dough whose cross-sectional geometry has been altered is conveyed in the direction of a transfer region, in which the dough to be conveyed or conveyed can be transferred to a dough-processing system that can be arranged or is arranged downstream of the conveying section. According to the method, separating agent is thus applied and dough is placed in the first conveying section portion, the dough is formed in the second conveying section portion, and the formed dough is conveyed onward in the third conveying section portion. All explanations in connection with the system apply analogously to the method.

BRIEF DESCRIPTION OF THE DRAWINGS

The disclosure is explained again by means of embodiments in the following drawings:

FIG. 11 shows a side view of a system according to a further embodiment; and

FIG. 12 shows a top view on the system shown in FIG. 11.

DETAILED DESCRIPTION

Figure 1:
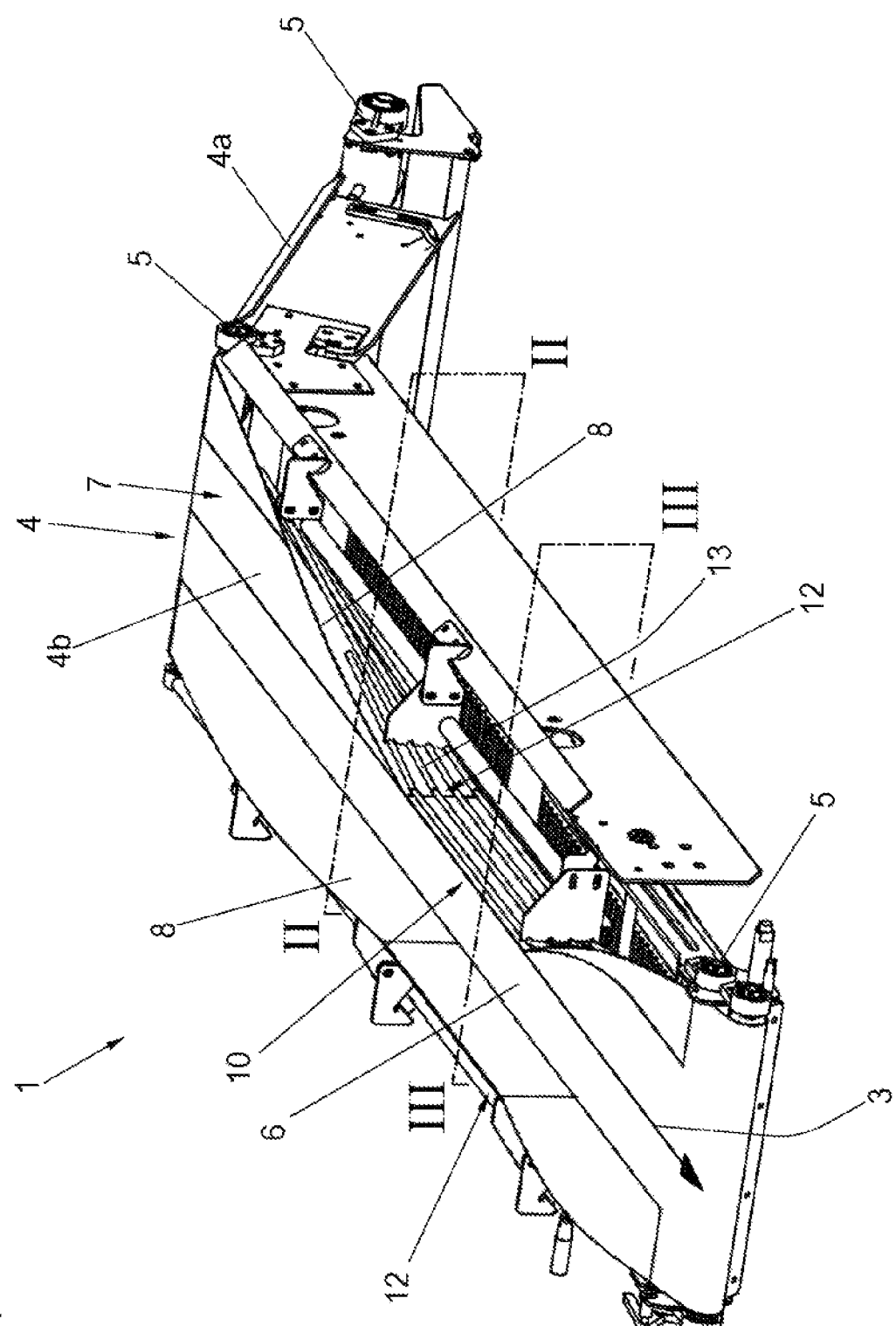
FIG. 1 shows a schematic diagram of a system for conveying dough along a conveying section according to an embodiment.

FIG. 1 shows a principle diagram of a system 1 for conveying dough 2 along a conveying section 3 indicated by the arrow also indicating the dough-conveying direction, according to an embodiment in a perspective view. By means of the system 1, which can also be referred to or considered as a dough-conveying system, continuously or discontinuously produced dough portions or pieces can be conveyed along the conveying section 3.

The system 1 can form part of or be associated with a superordinate facility (not shown) for processing dough 2.

The system 1 comprises an elongate dough-conveying element 4 defining the conveying section 3. In the embodiment shown in FIG. 1, the dough-conveying element 4 is configured to extend in sections at an angular inclination relative to a horizontal reference plane; the dough-conveying element 4 thus has a first dough-conveying element portion 4a, which extends at an angular inclination relative to the horizontal reference plane, and a second dough-conveying element portion 4b, which is arranged downstream of the first dough-conveying element portion 4a and extends parallel relative to the horizontal reference plane. Although not shown in the Figures, it is also possible in principle for the dough-conveying element 4 to be completely angled or to extend parallel to the horizontal reference plane.

In the embodiment shown in FIG. 1, the dough-conveying element 4 is exemplarily configured by a belt-like or belt-shaped dough-conveying element body forming a conveyor belt and thus as a dough conveyor belt. Equally, however, a configuration of the dough-conveying element 4 by a chain-like or chain-shaped dough-conveying element body forming a conveyor chain would be conceivable.

From FIG. 1 it is evident that the dough-conveying element 4 is arranged or formed to revolve around several roller-like or roller-shaped deflection bodies 5. The system 1 thus comprises several roller-like or roller-shaped deflection bodies 5, around which the dough-conveying element 4 is arranged or formed to rotate. The deflection bodies 5 can be arranged or formed on a, in particular frame-like or frame-shaped, supporting structure (not shown) of the system 1.

The dough-conveying element 4 comprises a dough-supporting region 6 forming or including a supporting surface 7 for dough 2 that can be conveyed or is to be conveyed by means of the system 1, and two lateral regions 8 extending laterally along the dough-supporting region 6 in the longitudinal direction of the dough-conveying element 4. Based on the cross-sectional views shown in FIGS. 2 and 3 and the perspective views shown in FIGS. 4-10, it can be seen that the dough-supporting region 6 forms a central region, i.e., the middle region, of the dough-conveying element 4 when viewed in cross-section.

The lateral regions 8 are arranged or formed on or in the vicinity of the dough-supporting region 6, extending laterally along the dough-supporting region 6 in the longitudinal direction of the dough-conveying element 4. The lateral regions 8 can be connected to the dough-supporting region 6 in a form-fitting, force-fitting and/or material-fitting manner at a respective longitudinal side edge of the dough-supporting region 6; a first lateral region 8 is arranged or formed on the dough-supporting region 6 extending laterally in the longitudinal direction of the dough-conveying element 4 along a first longitudinal side edge of the dough-supporting region 6, and a second lateral region 8 is arranged or formed on the dough-supporting region 6 extending laterally in the longitudinal direction of the dough-conveying element 4 along a second longitudinal side edge of the dough-supporting region 6.

Figure 2:
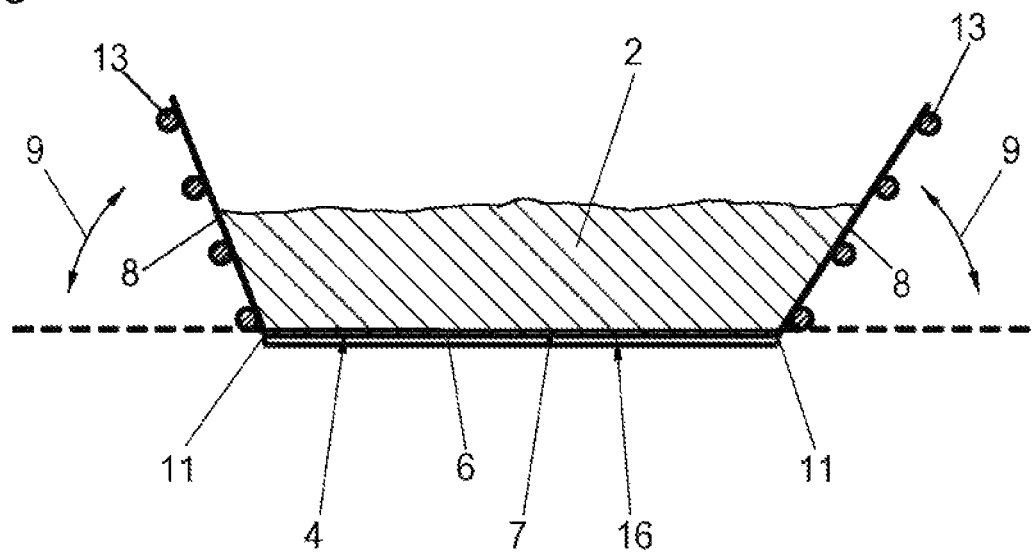
FIG. 2 shows a cross-sectional view according to section lines II-II of the system shown in FIG. 1.
Figure 3:
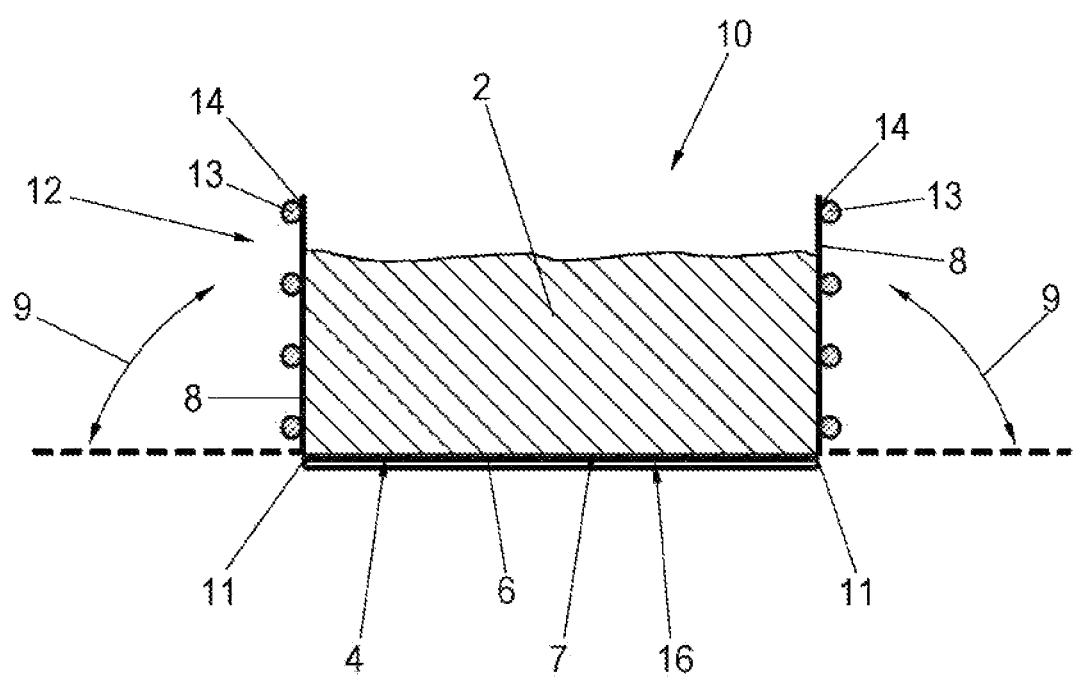
FIG. 3 shows a cross-sectional view according to section lines III-III of the system shown in FIG. 1.

It can be seen from FIGS. 2 and 3 that the lateral regions 8 are each arranged or formed on the dough-supporting region 6 so as to be movable, i.e., as indicated by the double arrows 9 in FIGS. 2 and 3, pivotable, relative to the dough-supporting region 6. The lateral regions 8 can thus be moved into different pivoted positions and thus different alignments relative to the dough-supporting region 6.

By means of a respective pivoting movement of the lateral regions 8 relative to the dough-supporting section 6, a dough-supporting region 10 (cf. in particular FIGS. 3, 11, 12) can be formed laterally, i.e., in particular U-like or U-shaped, surrounding the dough 2 that can be conveyed or is to be conveyed along the conveying section 3 by means of the dough-conveying element 4, viewed in cross-section. The lateral regions 8 are thus arranged or formed so as to be pivotable relative to the dough-supporting region 6, in particular for forming a corresponding dough-supporting region 10.

Specifically, the lateral regions 8 in the embodiments shown in the Figures are each aligned between a first pivoted position indicated by dashed lines in FIGS. 2 and 3, in which the lateral regions 8, viewed in cross-section, are arranged or aligned (substantially) parallel to the dough-supporting region 6, in particular such that, viewed in cross-section, a (substantially) uniformly flat surface of the dough-conveying element 4 results, and a second pivoted position shown in FIG. 3, in which the lateral regions 8, viewed in cross-section, are arranged or aligned at an angle, in particular at right angles, to the dough-supporting region 6, in particular such that the dough-forming region 10, which, viewed in cross-section, surrounds the dough 2 at least in sections laterally, in particular in a U-like or U-shaped manner, is formed, and vice versa. It can be seen from FIG. 2 that the lateral regions 8 can also be pivoted into intermediate pivoted positions lying between the first and second pivoted positions.

The arrangement or configuration of the lateral regions 8 on the dough-supporting region 6 can be realized, for example, by a hinge-like or hinge-shaped connection of the lateral regions 8 to the dough-supporting region 6. The lateral regions 8 can be connected to the dough-supporting region 6, for example, by a hinge or hinge-like element 11. In the case of a material-locking connection of the lateral regions 8 to the dough-supporting region 6, which can be given, for example, in the case of a one-piece configuration of the lateral regions 8 and the dough-supporting region 6, corresponding hinge elements 11 can be formed, for example, by a film hinge or comprise such a hinge.

FIGS. 1 and 3 also show a supporting system 12 that is adapted to support and/or stabilize the lateral regions 8 in the second pivoted position. The supporting device 12 includes a plurality of supporting bodies 13 arranged or formed in parallel and extending in the longitudinal direction of the dough-conveying element 4, each of which includes a supporting body portion 14 supporting the respective lateral region 8 in the second pivoted position. In the embodiment shown in FIGS. 1-3, the supporting bodies 13 are each configured as a supporting strut.

Although not shown in the Figures, it would also be conceivable to provide supporting bodies 13 in the form of supporting wedges.

The dough-conveying element 4 comprises a flexurally-rigid material behavior in the vicinity of the dough-supporting region 6 or in the dough-supporting region 6, and a resiliently-extensible material behavior in the vicinity of the lateral regions 8 or in the lateral regions 8. The dough-conveying element 4 thus has locally different mechanical properties and thus locally different material behavior in that it is configured to be flexurally-rigid or hard in the vicinity of the dough-supporting region 6 or in the dough-supporting region 6 and to be resiliently-extensible or soft in the vicinity of the lateral regions or in the lateral regions 8. In this way, an improved dough-conveying element 4, in particular with regard to dough conveying and dough forming, and thus an improved system 1 are provided, as the dough-conveying element 4 in the vicinity of the dough-supporting region 6 or in the dough-supporting region 6 has a desired flexurally or transversely rigid and thus generally rigid or hard material behavior and in the vicinity of the lateral region 8 or in the lateral regions 8 has a desired resiliently-extensible and thus generally soft material behavior. This targeted combination of different mechanical properties or different material behavior in the vicinity of the dough-supporting region 6 or in the dough-supporting region 6 and in the vicinity of the lateral regions 8 or in the lateral regions 8 has a positive effect on dough conveying and dough forming.

The flexurally-rigid material behavior in the region of the dough-supporting region 6 or in the dough-supporting region 6 is therefore expedient, as considerable forces, i.e., in particular bending or compressive forces, can act on the dough-supporting region 6 during dough-conveying and dough-forming, which can be absorbed by the flexurally-rigid material behavior of the dough-conveying element 4 in the region of the dough-supporting region 6. The dough 2 can therefore be deposited, conveyed and formed on a dough-conveying element 4 that is mechanically stable in the area of the dough-supporting region 6, which enables reproducible geometrically defined dough forming. Due to the locally flexurally-rigid configuration, there is no or a much reduced possibility of deflection of the dough-conveying element 4 in the vicinity of the dough-supporting region 6. The flexurally-rigid configuration is not selected to be so high that deflection of the dough-conveying element 4 at the deflection bodies 5 is no longer possible.

The resiliently-extensible material behavior in the lateral region 8 or in the lateral regions 8 is therefore expedient, as considerable forces, i.e., in particular extension or tensile forces, can act on the lateral regions 8 during a corresponding movement, i.e., in particular a corresponding pivoting movement, relative to the dough-supporting region 6, which forces can be absorbed by the resiliently-extensible material behavior of the dough-conveying element 4 in the vicinity of the lateral regions 8. An extension of the lateral regions 8 caused by a movement of the lateral regions 8 relative to the dough-supporting region 6 is thus possible without risk of damage to the dough-conveying element 4 due to the resiliently-extensible material behavior. The resiliently-extensible material behavior can also allow resilient recovery behavior of the lateral regions 8 from an extended state, which typically occurs with corresponding movement of the lateral regions 8 relative to the dough-supporting region 6, to a less or non-extended state.

The different material behavior in the vicinity of the dough-supporting region 6 or in the dough-supporting region 6 and in the vicinity of the lateral regions 8 or in the lateral regions 8 can be brought about, for example, by different materials or material structures for forming the dough-supporting region 6 and the lateral regions 8, i.e., different material pairings or material structure pairings. Thus, a flexurally-rigid or hard material or a flexurally-rigid or hard material structure can be used in the vicinity of the dough-supporting region 6 or in the dough-supporting region 6, and a resiliently-extensible or soft material or a resiliently-extensible or soft material structure can be used in the vicinity of the lateral region 8 or in the lateral regions 8.

Alternatively or additionally, it is also conceivable, for example, to generate locally different mechanical properties and thus locally different material behavior by structural measures. In the vicinity of the dough-supporting region 6 or in the dough-supporting region 6, for example, an increased thickness or wall thickness of the respective material or the respective material structure can be provided and/or the respective material or the respective material structure can be provided with reinforcing elements, such as ribs. In the vicinity of the lateral regions 8 or in the lateral regions 8, for example, a reduced thickness or wall thickness of the respective material or the respective material structure can be provided and/or the respective material or the respective material structure can be provided with weakening elements, such as recesses. This also applies in particular to the use of (chemically) similar or identical materials for configuring the dough-conveying element 4 in the vicinity of the dough-supporting region 6 and the lateral regions 8.

As explained in more detail in connection with the embodiments shown in FIGS. 4-10, the dough-conveying element 4 is configured in the vicinity of the dough-supporting region 6 or in the dough-supporting region 6 at least in sections, in particular completely, by a flexurally-rigid stiffening structure 16 for flexurally or transversely stiffening the dough-supporting region 6, or comprises at least one such stiffening structure.

Figure 4:
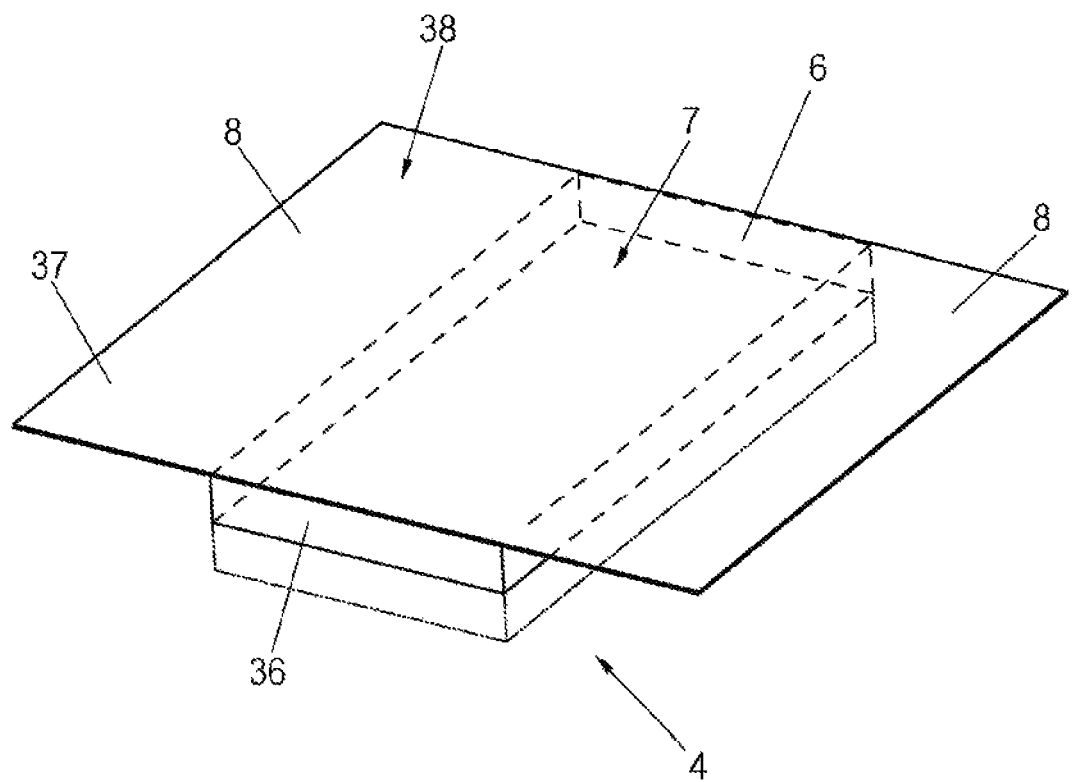
FIGS. 4-10 each show a principle diagram of a dough-conveying element according to a further embodiment.

In the embodiment shown in a perspective view in FIG. 4, the stiffening structure 16 is formed by a flexurally-rigid material or a flexurally-rigid material structure. Flexurally-rigid plastic materials, for example, can be considered as flexurally-rigid materials. In particular, flexurally-rigid thermoset or thermoplastic materials, possibly provided with reinforcing fibers, such as glass fibers, are conceivable. Flexurally-rigid material structures are, for example, arrangements and/or alignments of materials or components formed from such materials, which result in flexural rigidity. Conceivable are, for example, grid-like or rib-like arrangements or alignments of corresponding components.

In the embodiment shown in FIG. 4, the stiffening structure 16 is specifically formed by a flexurally-rigid supporting body 36, wherein a resiliently-extensible material 37 forming the lateral regions 8 or a resiliently-extensible material structure forming the lateral regions 8 is attached to and/or on the supporting body 36. The resiliently-extensible material 37 or the resiliently-extensible material structure may be attached to the supporting body 36, for example, as a side region element adjacent to the supporting body 36. In the embodiment shown in FIG. 4, the resiliently-extensible material 37 or the resiliently-extensible material structure is attached to and/or on the supporting body 36 as a supporting element 38 resting on the supporting body 36. The resiliently-extensible material 37 or the resiliently-extensible material structure spans the surface or upper side of the supporting body 36. Obviously, the resiliently-extensible material 37 or the resiliently-extensible material structure forms the dough-supporting region 6. The flexural rigidity of the dough-conveying element 4 in the vicinity of the dough-supporting region 6 or in the dough-supporting region 6 is also provided in this case due to the flexural rigidity of the supporting body 36. As shown in dashed lines, several supporting bodies 36 may be provided, for example in a row-like or stack-like arrangement.

It can be seen from FIG. 4 that a supporting body 36 can have a rectangular geometry when viewed in cross-section. The supporting body 36 is typically dimensioned in its maximum width to correspond to the width of the dough-supporting region 6.

In all cases, the resiliently-extensible material 37 or the resiliently-extensible material structure can be attached to and/or on the supporting body 36 in a form-fit, force-fit and/or material-fit manner, for example. In particular, material-locking attachment methods such as bonding or welding are considered.

In order to counter the problem of insufficient mechanical stability, i.e., in particular insufficient flexural or transverse rigidity, of the dough-conveying element 4 in the dough-supporting region 6, the dough-conveying elements 4 in the embodiments shown in FIGS. 5-10 are provided at least in sections, at least in the dough-supporting region 6, with a stiffening structure 16 comprising at least one stiffening element 17 for flexural or transverse stiffening at least of the dough-supporting region 6. The stiffening structure 16 gives the dough-conveying element 4, i.e., in particular the dough-supporting region 6, a sufficiently high mechanical stability, i.e., in particular a sufficiently high flexural or transverse rigidity so that a (largely) defined forming of the dough 2, which may be necessary or at least expedient for subsequent dough-processing processes, is possible with the dough-conveying element 4. As can be seen, for example, from FIG. 3, the dough 2 can thus be given a defined (largely) rectangular cross-sectional geometry, since the dough-supporting region 6 is not inclined to sag due to the stiffening structure 16, in particular also when the lateral regions 8 are pivoted. Due to the stiffening of the dough-conveying element 4 in the vicinity of the dough-supporting region 6, a flat support of the dough 2 on the dough-conveying element 4 is ensured.

Due to the stiffening of the dough-conveying element 4 in the vicinity of the dough-supporting region 6, any (mechanical) tension acting on the dough-conveying element 4 in order to keep the dough-conveying element 4 flat can furthermore be reduced, since the dough-conveying element 4 is inherently already mechanically stable, i.e., in particular stiff, to such an extent that an (additionally) applied tension is not required or is required to a (considerably) reduced extent in order to keep the dough-supporting region 6 or the dough-conveying element 4 flat. This applies to all embodiments with a stiffening structure 16.

The (additional) mechanical stabilization or stiffening of the dough-conveying element 4, at least in the dough-supporting region 6, brought about by the stiffening structure 16 can furthermore have a positive effect on the conveying properties of the dough-conveying element 4. This also applies to all embodiments with a stiffening structure 16.

Based on the embodiments shown in FIGS. 5-10, further embodiments of a stiffening structure 16 comprising at least one stiffening element 17 are explained by way of example.

Figure 5:
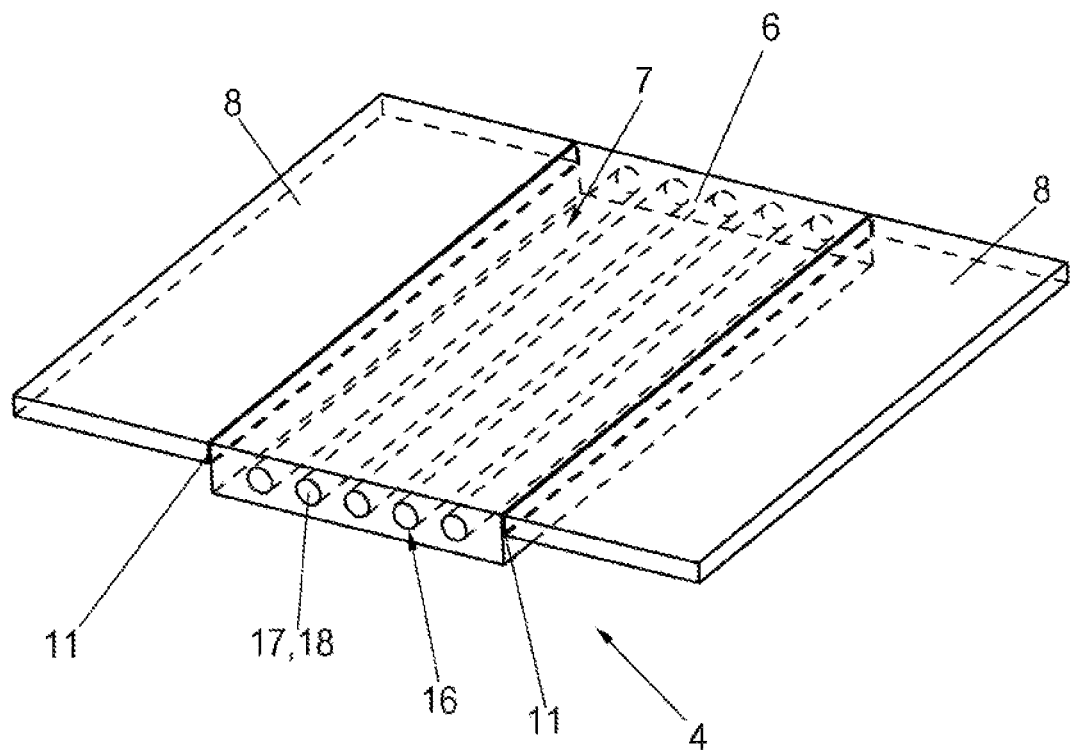

In the embodiment shown in a perspective view in FIG. 5, the stiffening structure 16 comprises several stiffening elements 17 each in the form of a rod- or strut-like stiffening body 18 arranged or formed in the dough-supporting region 6 in the dough-conveying element 4, i.e., in particular, a tension body or tension rod bringing about a stiffening of the dough-supporting region 6. The respective stiffening bodies 18 can be arranged or formed to extend in the longitudinal direction, as shown in FIG. 5. The stiffening structure 16 thus comprises at least a two-dimensional arrangement of corresponding stiffening bodies 18. A three-dimensional arrangement of corresponding stiffening bodies 18 is also conceivable. The stiffening bodies 18 can thus be arranged or formed in one or more planes extending in one or more spatial directions. The arrangement of the stiffening bodies 18 is selected such that a stiffening effect results due to the arrangement and/or alignment of the stiffening bodies 18.

The rigidity of a corresponding stiffening body 18 may exceed the rigidity of the remaining dough-conveying element 4 or of a base material forming the remaining dough-conveying element 4. Accordingly, the stiffening body 18 may be formed of a stiffer material compared to the dough-conveying element 4, i.e., for example, a comparatively stiffer plastic or metal. However, this is not absolutely necessary, as a stiffening effect can also result from the arrangement of several corresponding stiffening bodies 18, as mentioned.

Figure 6:
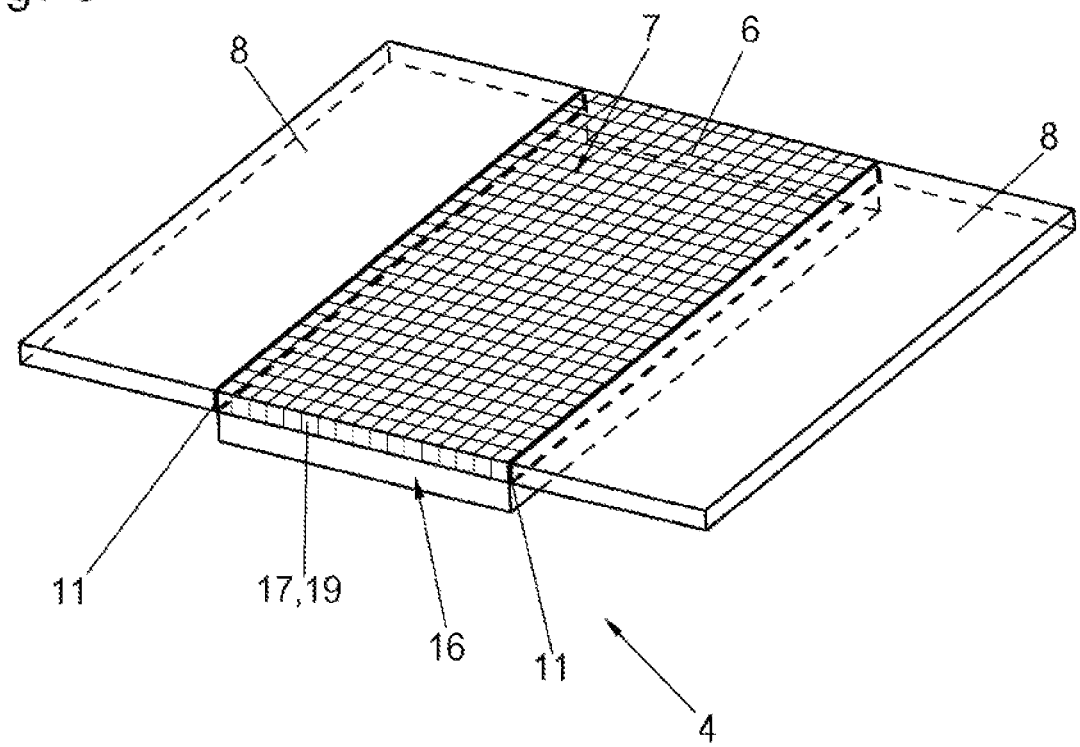

In the embodiment shown in a perspective view in FIG. 6, the stiffening structure 16 comprises a stiffening element 17 in the form of a textile-like reinforcing fiber arrangement 19 arranged or formed in the dough-supporting region 6 in the dough-conveying element 4. The reinforcing fiber arrangement 19 comprises an ordered or disordered textile-like two- or three-dimensional arrangement of a plurality of reinforcing fibers, i.e., for example, carbon and/or glass fibers and/or metal fibers or wires. The textile-like arrangement of reinforcing fibers may be, for example, knitted, woven, tangled or crocheted; thus, the reinforcing fiber arrangement 19 may be, for example, a knitted, woven, tangled or crocheted fabric. The textile-like arrangement of the reinforcing fibers is typically selected to provide a stiffening effect due to the arrangement and/or alignment of the reinforcing fibers. The reinforcing fiber arrangement 19 or the reinforcing fibers can thus be arranged or formed in one or more planes extending in one or more spatial directions.

The rigidity of the reinforcing fiber arrangement 19 or the reinforcing fibers may exceed the rigidity of the remaining dough-conveying element 4 or a base material forming the remaining dough-conveying element 4. Accordingly, the reinforcing fiber arrangement 19 or the reinforcing fibers may or may not be formed of a stiffer material compared to the dough-conveying element, i.e., for example, a comparatively stiffer plastic or metal. However, this is not absolutely necessary, as a stiffening effect, as mentioned, can also result from the arrangement of several corresponding reinforcing fiber arrangements 19 or reinforcing fibers.

Figure 7:
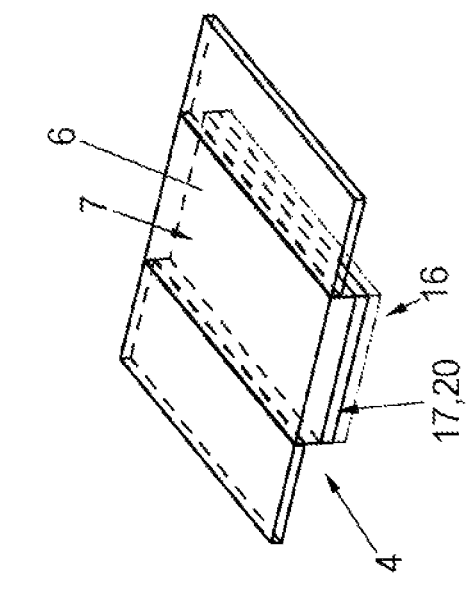

In the embodiment shown in a perspective view in FIG. 7, the reinforcing structure 16 includes a reinforcing element 17 in the form of a flat reinforcing base 20 made of a rigid material, i.e., for example, a rigid plastic or metal, or a rigid material structure, i.e., for example, a rigid plastic or metal structure, arranged or attached in the region of a surface of the dough-conveying element 4 facing away from the dough-supporting region 6. Of course, as indicated by dashes, an arrangement of multiple reinforcing bases 20 may also be provided. A corresponding arrangement of several reinforcing bases 20 can be selected in such a way that an (additional) stiffening effect results due to the arrangement and/or alignment of the reinforcing bases 20. This may apply, for example, to a stack-like or -shaped arrangement of reinforcing bases 20. The reinforcing bases 20 may thus be arranged or configured in one or more planes extending in one or more spatial directions. The number and arrangement of reinforcing bases 20 can vary locally so that a locally different rigidity can be generated in a targeted manner.

The rigidity of the reinforcing base 20 may exceed the rigidity of the remaining dough-conveying element 4 or of a base material forming the remaining dough-conveying element 4. Accordingly, the reinforcing base 20 may be formed of a stiffer material compared to the dough-conveying element 4. However, this is not absolutely necessary, as a stiffening effect can, as mentioned, also result from the arrangement of several corresponding reinforcing bases 20. It is also conceivable that a reinforcing base 20 has an increased rigidity due to a greater thickness compared to the dough-conveying element 4.

Figure 8:
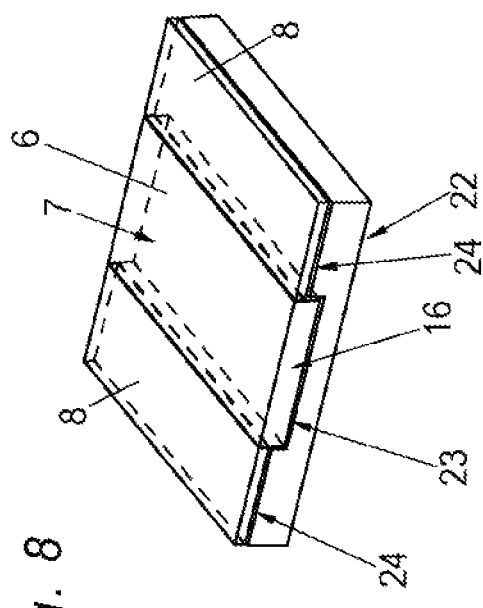

FIG. 8 shows a further embodiment of a dough-conveying element 4 in a perspective view. Based on the embodiment shown in FIG. 8, it can be seen that the system 1 can comprise a guiding device 22, which is set up for guiding, in particular for transversely guiding, the dough-conveying element 4 along the conveying section 3. The guiding device 22 comprising a U-like or U-shaped cross-sectional geometry includes a trough-like or trough-shaped recessed receiving region 23 for receiving, in particular precisely fitting, the dough-supporting region 6 of the dough-conveying element 4, as well as respective supporting regions 24 arranged elevated in particular in comparison to the receiving region 23, i.e., in particular to a base of the receiving region 23, for supporting the lateral regions 8 of the dough-conveying element 4.

This results in the fact that the dough-conveying element 4 (also independently of the presence of a corresponding guiding device) can have a stepped geometry when viewed in cross-section. A stepped geometry of the dough-conveying element 4, viewed in cross-section, can result from a reduced thickness or wall thickness of the lateral regions 8 compared to the dough-supporting region 6, as well as their arrangement or formation on the dough-supporting region 6; it can be seen from FIG. 8 that the lateral regions 8 can be arranged or formed in the region of an upper section of a short side of the dough-supporting region 6 in the case of a dough-supporting region 6 that is (largely) rectangular, viewed in cross-section.

Figure 9:
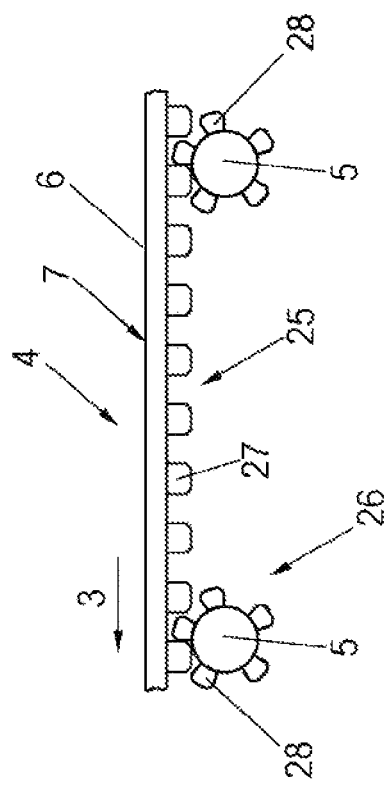

FIG. 9 shows a further embodiment of a dough-conveying element 4 in a side view. On the basis of the embodiment shown in FIG. 9, it is apparent that the dough-conveying element 4 can be configured with a drive structure 25, in particular a toothed belt-like or toothed belt-shaped drive structure 25, in the region of its surface facing away from the dough-supporting region 6. The drive structure 25 is adapted to cooperate with a drive system 26 that sets the dough-conveying element 4 into a conveying motion. The dough-conveying element 4 can thus be configured in the region of its surface facing away from the dough-supporting region 6, which can also be designated or considered as the inner side of the dough-conveying element 4, with the functionality of a power transmission element, such as a drive or transmission belt. The interaction between the drive structure 25 and a corresponding drive device 26 can consist, as exemplarily shown in FIG. 9, in a mechanical coupling, i.e., in particular in a mechanical engagement, of the drive structure 25 on the side of the dough conveying element, e.g., of respective tooth-like or tooth-shaped drive elements 27 of the drive structure 25 on the side of the dough conveying element, with drive elements 28 corresponding thereto—these are exemplarily indicated in FIG. 9 on corresponding deflection bodies 5—of the drive device 26. The interaction of the drive structure 25 on the dough-conveying element side and the drive device 26, which comprises a drive motor, makes it possible to transmit to the dough-conveying element 4 a drive force that sets the dough-conveying element 4 into a conveying motion. It is conceivable that a drive structure 25 on the dough-conveying element side can also exert a stiffening effect on the dough-conveying element 4 due to its geometric-constructive configuration and can therefore be regarded as a stiffening structure 16.

Figure 10:
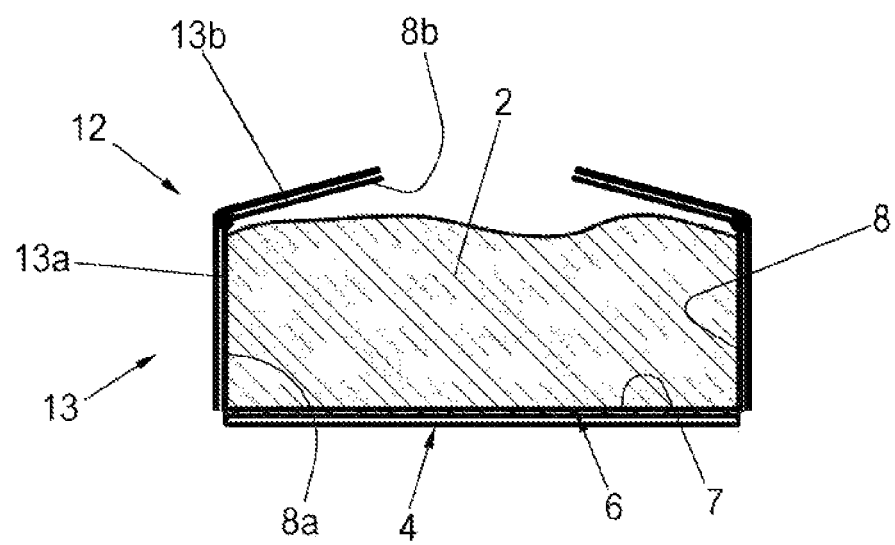

FIG. 10 shows a further embodiment of a dough-conveying element 4 in a cross-sectional view. On the basis of the embodiment shown in FIG. 12, coming back to the supporting device 12 already mentioned in connection with FIGS. 1-3, it is apparent that a corresponding supporting body 13 can be formed, for example by segmentation, with differently functionalized or supporting body sections 13a, 13b. Thereby, with respect to a respective lateral region 8 of the dough-conveying element 4, a first supporting body portion 13a may support a first lateral region portion 8a in a first angular alignment relative to the dough-supporting region 6, and at least a second supporting body portion 13b may support a second lateral region portion 8b in a second angular alignment relative to the dough-supporting region 6. The first angular alignment of the first lateral region portion 8a, when viewed in cross-section, may condition an angular alignment of a first lateral region portion 8a in an angular range between 0 and 90° relative to the dough-supporting region 6. The second angular alignment of a second lateral region portion 8b may, viewed in cross-section, condition an angular alignment of the second lateral region portion 8b in an angular range between 0 and 90° relative to the first lateral region portion 8a.

The supporting body device 12 can thus comprise two supporting bodies 13 or supporting body portions 13a, 13b which can be arranged and aligned differently relative to a dough 2 placed on the dough-supporting region 6. The alignment of the supporting bodies 13 or supporting body portions 13a, 13b can be performed by a separate guiding device (not shown) which moves the supporting bodies 13 or supporting body portions 13a, 13b into the corresponding arrangement or alignment relative to a respective first or second lateral region portion 8a, 8b.

Accordingly, the lateral regions 8 can also comprise two lateral region portions 8a, 8b that can be arranged and aligned differently relative to a dough 2 placed on the dough-supporting region 6. In this context, a respective first lateral region portion 8a can in particular be arranged and aligned relative to a dough 2 placed on the dough-supporting region 6 such that it laterally surrounds or supports the dough 2, and a respective second lateral region portion 8b can in particular be arranged and aligned relative to the dough 2 placed on the dough-supporting region 6 such that it surrounds or supports the dough 2 at least in sections on the upper side. Support of the dough 2 on the underside is provided by the dough-supporting region 6.

The two lateral region portions 8a, 8b can thereby be independently arranged and aligned in different arrangements or alignments relative to the dough-supporting region 6 or a dough 2 placed on the dough-supporting region 6.

As shown in FIG. 10, the above explanations can be explained by way of example on the basis of a (substantially) rectangular dough 2 or dough piece viewed in cross-section, which rests with one long side (underside) on the dough-supporting region 6. The first lateral region portions 8a support the dough 2 laterally in each case, i.e., in the region of the short sides of the rectangular dough 2 or dough piece, the second lateral region portions 8b support the dough 2 or dough piece on the upper side, i.e., in the region of its exposed longitudinal side (upper side) of the dough 2 or dough piece.

For all embodiments, the system 1 can comprise a tensioning device (not shown) that (mechanically) tensions the dough-conveying element 4, in particular in the longitudinal direction of the dough-conveying element 4. A corresponding tensioning device is arranged for generating a tensioning force tensioning the dough-conveying element 4, in particular in the longitudinal direction of the dough-conveying element 4. A corresponding tensioning device may comprise one or more tensioning elements acting on the dough-conveying element 4 for tensioning the dough-conveying element 4. Corresponding tensioning elements may be tensioning springs, for example.

FIG. 11 shows a side view of a system 1 according to a further embodiment, and FIG. 12 shows a top view of the system 1 shown in FIG. 11.

From FIGS. 11 and 12, it can be seen that the conveying section 3 has several conveying section portions 3.1-3.3 with different functions, which will be explained individually below:

The conveying section 3 comprises a first conveying section portion 3.1. In the first conveying section portion 3.1, the dough 2 to be conveyed along the conveying section 3 can be placed or deposited on the dough-conveying element 4 or on the conveying section 3. Furthermore, in the first conveying section portion 3.1, a separating agent 29 is applied to the dough-conveying element 4. It is evident that the application of the separating agent 29 takes place in a region of the first conveying section portion 3.1, cf. conveying section sub-portion 3.1.1, which is arranged upstream of a region of the first conveying section portion 3.1, cf. conveying section sub-portion 3.1.1, in which the dough 2 can be placed or deposited on the dough-conveying element 4. The first conveying section portion 3.1 can be referred to or considered as the infeed or dough-depositing section.

From FIGS. 11 and 12, it can be seen that the first conveying section portion 3.1 can be dimensioned in terms of length such that it permits extensive application of separating agent 29, i.e., in particular complete application of separating agent 29 over the entire width of the dough-conveying element 4, before the dough 2 is actually deposited.

In a second conveying section portion 3.2 arranged downstream of the first conveying section portion 3.1, the cross-sectional geometry of the dough 2 can be varied. The second conveying section portion 3.2 can be designated or regarded as a dough-forming section. Due to the application of separating agent 29 already carried out in the first conveying section portion 3.1, the dough 2 conveyed in the second conveying section portion 3.2 is already deposited on a dough-conveying element 4 extensively or completely provided with separating agent 29. The forming of the dough 2 in the second conveying section portion 3.2 can be effected by the angular, i.e., in particular right-angled, alignment of the lateral regions 8 of the dough-conveying element 4 movably arranged or formed relative to the dough-supporting region 6 of the dough-conveying element 4 (cf. FIG. 3). The dough forming results in a (largely) rectangular cross-sectional geometry of the dough 2.

FIGS. 11 and 12 show that the dough 2 can be deposited on the first conveying section portion 3.1 in a region of the first conveying section portion 3.1 in which a dough-forming region 10 surrounding the dough 2, in particular U-like or U-shaped, is already at least partially formed. The dough 2 is thus deposited in a region of the first conveying section portion 3.1 in which the dough-conveying element 4 already has an altered cross-sectional geometry compared to its original cross-sectional geometry. This alteration of the cross-sectional geometry of the dough-conveying element 4 in the first conveying section portion 3.1 is related to the aforementioned formation of a corresponding, in particular U-like or U-shaped dough-forming area 10 ("cupping"). The depositing of the dough 2 in the vicinity of the first conveying section portion 3.1, in which the dough-forming region 10 surrounding the dough 2 is at least partially formed, has a positive effect on the dough conveying and dough forming; this results in particular from the fact that the dough 2—this applies in particular to particularly flowable or soft doughs 2—does not have the possibility of flowing laterally.

In a third conveying section portion 3.3 arranged downstream of the second conveying section portion 3.2, the dough 2, which has been altered in its cross-sectional geometry, can be conveyed in the direction of a transfer region 30, in which the dough 2 can be transferred to a dough-processing device which can be arranged or is arranged downstream of the system 1, i.e., for example, to a further dough-forming device. The third conveying section portion 3.3 can be designated or considered as a discharge or transfer region.

As exemplified by the first conveying section portion 3.1, each of said conveying section portions 3.1-3.3 may in turn comprise at least two conveying section sub-portions, possibly different ones having sub-functions of the superordinate function of the respective conveying section portion 3.1-3.3.

In the illustrated embodiment, the first conveying section portion 3.1 is divided into two conveying section sub-portions 3.1.1, 3.1.2, wherein in the first conveying section sub-portion 3.1.1, separating agent 29 is applied to the dough-conveying element 4 and in the second conveying section sub-portion 3.1.2, dough 2 is deposited. Accordingly, in the vicinity of the first conveying section sub-portion 3.1.1 a (first) separating agent application device 31 is arranged, via which a separating agent 29, e.g., flour, can be applied to the first conveying section sub-portion 3.1.1, and in the vicinity of the second conveying section sub-portion 3.1.2 a dough-depositing device 33 associated with the first conveying section sub-portion 3.1, which is in particular a dough-portioning device in the form of a star-roller portioning device, which is adapted for the continuous or discontinuous depositing of dough 2, in particular of defined dough portions, onto the first conveying section sub-portion 3.1 or the second conveying section sub-portion 3.1.2. In the embodiments shown in the Figures, the dough-depositing device 33 is arranged relative to the conveying section 3 or the first conveying section portion 3.1 such that it enables dough 2 to be deposited on the first conveying section portion 3.1 or the second conveying section sub-portion 3.1.2.

In the embodiment shown in the Figures, the first conveying section sub-portion 3.1.1 correlates with the first dough-conveying element portion 4a and the second conveying section sub-portion 3.1.2 correlates with the first dough-conveying element portion 4b. However, this is not absolutely necessary.

To enable extensive application of separating agent 29 to the dough-conveying element 4, in particular before the dough 2 is placed on the dough-conveying element 4, the first conveying section portion 3.1 is particularly dimensioned in terms of length. In the embodiment, the first conveying section portion 3.1 has an exemplary length L1 of more than 50% of the total length L of the conveying section 3.

This significantly extended configuration of the first conveying section portion 3.1 ensures the possibility of an extensive application of separating agent 29 to the dough-conveying element 4 before the dough 2 is actually placed on the dough-conveying element 4, which has a positive effect on the conveying and forming of the dough 2. The first conveying section portion 3.1 can be completely provided with separating agent 29 before the dough 2 is actually placed on it. In particular, an extensive application of separating agent 29 over the entire width of the dough-conveying section portion 4 is possible before the dough 2 is actually deposited on the dough-conveying section portion 4, so that the dough 2 that can be deposited on the dough-conveying section portion 4 in the second conveying section sub-portion 3.1.2 of the first conveying section portion 3.1 can already be deposited on the dough-conveying section portion 4 that is extensively or completely provided with separating agent 29. The separating agent 29 can thus be applied such that the separating agent 29 (as far as possible) completely surrounds the dough 2 resting on the dough-conveying element 4, at least in the region of possible contact areas with the dough-conveying element 4.

In the embodiment shown in the Figures, the particular length dimension of the first conveying section portion 3.1 results in the first conveying section portion 3.1 having a greater length L1 than the second and/or third conveying section portions 3.2, 3.3.

The second and third conveying section portions 3.2, 3.3 can, for example, together have a length L1, L2 of less than 50% of the total length L of the conveying section 3. The total length of the second and third conveying section portions 3.2, 3.3 resulting from the sum of the lengths L1, L2 of the second and third conveying section portions 3.2, 3.3 can therefore be less than 50% of the total length L of the conveying section 3.

The embodiment shows that the second and third conveying section portions 3.2, 3.3 can have the same length; in principle, however, it is also conceivable that the second and third conveying section portions 3.2, 3.3 have different lengths L2, L3.

As mentioned, the system 1 comprises a first separating agent application device 31 associated with the first conveying section portion 3.1, which is adapted to apply a separating agent 29 to the first conveying section portion 3.1 or the first conveying section sub-portion 3.1.1. The first separating agent application device 31 is arranged relative to the conveying section 3 or the first conveying section sub-portion 3.1 such that it enables application of the separating agent 29 to the first conveying section sub-portion 3.1.1.

The first separating agent application device 31 is in particular set up to apply the separating agent 29, viewed in cross-section, over the entire width of the first conveying section portion 3.1 or the entire width of the dough-conveying element 4 in the vicinity of the first conveying section portion 3.1. In such a way, the possibility of an extensive or complete application of separating agent 29 to the dough-conveying element 4 before the dough 2 is actually placed on the dough-conveying element 4 is ensured.

The system 1 further comprises a second separating agent application device 32 associated with the second conveying section portion 3.2, which is arranged to apply a separating agent 29 to the second conveying section portion 3.2, in particular to exposed areas of dough 2 conveyed along the second conveying section portion 3.2, or to a dough-forming device 35 associated with the second conveying section portion 3.2. The second separating agent application device 32 can ensure that a sufficient amount of separating agent 29 is always present in the second conveying section portion 3.2, in which, as mentioned, a corresponding alteration of the cross-sectional geometry of the dough 2 or a forming of the dough 2 takes place.

The (second) separating agent application device 32 is adapted to apply the separating agent 29, viewed in cross-section, over the entire width of the second conveying section portion 3.2, in particular the entire width of the exposed area of the dough 2 conveyed along the second conveying section portion 3.2, or the entire width of a roller- or roll-shaped dough-forming device 34 associated with the dough-forming device 35. In such a way, the possibility of an extensive or complete application of separating agent 29 to the dough-conveying element 4 or to the dough 2 during the alteration of the cross-sectional geometry of the dough 2 or during the forming of the dough 2 is ensured.

The application of the separating agent 29 by means of the first and/or the second separating agent application device 31, 32 can be carried out depending on the type of separating agent 29, i.e., in particular on the type of its aggregate state, e.g., by blowing, trickling, casting, pouring, etc. The first and/or second separating agent application device 31, 32 can accordingly be configured, for example, as a blowing, trickling, casting or pouring device.

The system 1 further comprises the aforementioned dough-forming device 35 associated with the second conveying section portion 3.2 and comprising at least one dough-forming element 34, for example in the form of a dough-forming roller or a dough-forming cylinder. The dough-forming device 35 is arranged to exert a vertically acting force, indicated by the arrow F, on the dough 2 in order to (largely) deform the dough 2 in a defined manner. In such a way, the aforementioned alteration of the cross-sectional geometry or forming of the dough 2 can be effected or promoted. Due to the described extensive application of separating agent 29 via the first and/or second separating agent application device 31, 32, the possibility of the dough 2 also adhering to the dough-forming element 34 is prevented or at least considerably reduced.

In all embodiments, the dough-conveying element 4 may be formed of, for example, a natural or synthetic elastomeric material or a natural or synthetic resin material, in particular a PU resin material.

The lateral regions 8 can have a lower hardness compared to the dough-supporting region 6. For example, the lateral regions 8 can have a hardness in a range between 70 and 80

Shore A, whereas the dough-supporting region 6 has a hardness of at least 95 Shore A.

All embodiments can be combined with or among each other as desired. Thus, individual, several or all features of one embodiment can be combined with individual, several or all features of at least one other embodiment.

The invention claimed is:

1. A system for conveying dough along a conveying section, comprising:
    an elongate dough-conveying element that defines a conveying section, which dough-conveying element comprises a dough-supporting region that forms a supporting surface for dough conveyable or to be conveyed by means of the system and at least one lateral region extending laterally along the dough-supporting region in a longitudinal direction of the dough-conveying element, wherein the at least one lateral region is movably disposed or formed relative to the dough-supporting region, and wherein the dough-conveying element exhibits flexurally-rigid material behavior in a vicinity of the dough-supporting region and resiliently-extensible material behavior in a vicinity of the at least one lateral region; and
    a drive device configured to transmit a drive force to the dough-conveying element to set the dough-conveying element in a conveying motion, the drive device including a deflection body having a roller-shaped main body and multiple drive elements projecting outwardly from the main body;
    wherein the dough-conveying element comprises a drive structure including multiple tooth-shaped drive elements that project from a surface of the dough-conveying element facing away from the supporting surface and that are configured to cooperate with the drive elements of the drive device to enable the drive device to transmit the drive force to the dough-conveying element, wherein the tooth-shaped drive elements each have a first width, and the drive elements of the drive device each have a second width that is less than the first width, wherein each drive element of the drive device has an outer end and an inner end adjacent the main body of the deflection body, and wherein each drive element of the drive device tapers toward its inner end.

2. The system according to claim 1, wherein the dough-conveying element is configured at least in sections by a flexurally-rigid stiffening structure for flexurally stiffening the dough-supporting region or comprises at least one such stiffening structure.

3. The system according to claim 2, wherein the stiffening structure is formed by a flexurally-rigid material or a flexurally-rigid material structure.

4. The system according to claim 3, wherein the stiffening structure is formed by a flexurally-rigid supporting body, wherein an elastically-extensible material forming the at least one lateral region or an elastically-extensible material structure forming the at least one lateral region is attached to and/or disposed on the supporting body.

5. The system according to claim 4, wherein the resiliently-extensible material or the resiliently-extensible material structure is attached to and/or disposed on the supporting body as a supporting element resting on the supporting body.

6. The system according to claim 2, wherein the stiffening structure comprises at least one stiffening element formed as a stiffening body arranged or configured on or in the dough-conveying element in the dough-supporting region.

7. The system according to claim 6, wherein the stiffening body comprises a tension rod configured to stiffen the dough-supporting region.

8. The system according to claim 2, wherein the stiffening structure comprises at least one stiffening element formed as a reinforcing fiber arrangement arranged or configured in the dough-supporting region, on or in the dough-conveying element.

9. The system according to claim 8, wherein the reinforcing fiber arrangement is formed by an arrangement of carbon and/or glass fibers.

10. The system according to claim 2, wherein the stiffening structure comprises at least one stiffening element formed as a flat reinforcing base arranged or attached in the region of a surface of the dough-conveying element facing away from the dough-supporting region.

11. The system according to claim 10, wherein the reinforcing base is formed of a rigid material or a rigid material structure.

12. The system according to claim 1, wherein the at least one lateral region is configured for forming a dough-forming region for the dough that can be conveyed or is to be conveyed along the conveying section by means of the dough-conveying element, when viewed in cross-section, at least in sections laterally.

13. The system according to claim 12, wherein the at least one lateral region is movable between
    a first pivoted position, in which the at least one lateral region is arranged and/or aligned parallel to the dough-supporting region when viewed in cross-section, so that a uniformly flat surface of the dough-conveying element results when viewed in cross-section, and
    at least a second pivoted position, in which the at least one lateral region, viewed in cross-section, is arranged and/or aligned at an angle to the dough-supporting region, so that the at least one lateral region and the dough-supporting region form the dough-forming region for the dough which can be conveyed or is to be conveyed by means of the dough-conveying element along the conveying section.

14. The system according to claim 12, further comprising a supporting device arranged for supporting and/or stabilizing the at least one lateral region in the second pivoted position, wherein
    the supporting device comprises at least one supporting body, which comprises at least one supporting body portion for supporting the at least one lateral region (8) in the second pivoted position.

15. The system according to claim 1, wherein a guiding device is provided for guiding the dough-conveying element along the conveying section, wherein the guiding device comprises a recessed receiving region configured for receiving the dough-supporting region.

16. A facility for processing dough, comprising at least one system according to claim 1.

17. The system according to claim 1, wherein the at least one lateral region comprises two lateral regions disposed on opposite sides of the dough-supporting region, and wherein the lateral regions are pivotable with respect to the dough-supporting region to form a U-shaped dough-forming region when viewed in cross-section.

18. The system according to claim 1, wherein the drive structure of the dough-conveying element exerts a stiffening effect on the dough-conveying element due to its geometric configuration.

19. A dough-conveying element for a system for conveying dough, wherein the system includes a drive device configured to transmit a drive force to the dough-conveying element to set the dough-conveying element in a conveying motion, the drive device including a deflection body having a roller-shaped main body and multiple drive elements projecting outwardly from the main body, the dough-conveying element comprising:

an elongate dough-supporting region that forms a supporting surface for dough to be conveyed, and at least one lateral region extending laterally from the dough-supporting region and longitudinally along the dough-supporting region in a longitudinal direction of the dough-conveying element, wherein the at least one lateral region is movably disposed or formed relative to the dough-supporting region, wherein the dough-conveying element exhibits flexurally-rigid material behavior in a vicinity of the dough-supporting region and resiliently-extensible material behavior in a vicinity of the at least one lateral region, wherein the dough-conveying element further comprises a drive structure including multiple tooth-shaped drive elements that project from a surface of the dough-conveying element facing away from the supporting surface and that are configured to cooperate with the drive elements of the drive device so that the drive device is able to set the dough-conveying element in the conveying motion, wherein the tooth-shaped drive elements each have a width that is greater than a width of each of the drive elements of the drive device.

20. The dough-conveying element according to claim 19, wherein the at least one lateral region is pivotable between a first position, in which the at least one lateral region is arranged parallel to the dough-supporting region when viewed in cross-section, so that a uniformly flat surface of the dough-conveying element results when viewed in cross-section, and a second position, in which the at least one lateral region, viewed in cross-section, is arranged at an angle to the dough-supporting region, so that the at least one lateral region is not arranged parallel to the dough-supporting region when viewed in cross-section.

* * * * *